(12) United States Patent
Surnilla et al.

(10) Patent No.: US 8,146,541 B2
(45) Date of Patent: Apr. 3, 2012

(54) METHOD FOR IMPROVING TRANSIENT ENGINE OPERATION

(75) Inventors: Gopichandra Surnilla, West Bloomfield, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/756,784

(22) Filed: Apr. 8, 2010

(65) Prior Publication Data
US 2011/0132323 A1 Jun. 9, 2011

(51) Int. Cl.
*F02M 43/00* (2006.01)
*F02M 21/02* (2006.01)

(52) U.S. Cl. ... 123/3; 123/1 A; 123/27 GE; 123/406.31; 123/525; 123/575

(58) Field of Classification Search ............ 123/1 A, 123/3, 27 GE, 406.31, 525, 575, 577
See application file for complete search history.

(56) References Cited

U.S. PATENT DOCUMENTS

| | | | |
|---|---|---|---|
| 4,480,595 A * | 11/1984 | Hobby et al. | 123/1 A |
| 4,550,691 A * | 11/1985 | McWade | 123/3 |
| 5,176,122 A | 1/1993 | Ito | |
| 5,224,452 A | 7/1993 | Tomizawa | |
| 5,372,411 A | 12/1994 | Gerstenmaier et al. | |
| 5,445,019 A | 8/1995 | Glidewell et al. | |
| 5,526,797 A | 6/1996 | Stokes | |
| 5,529,048 A | 6/1996 | Kurihara et al. | |
| 5,542,394 A | 8/1996 | Tomisawa | |
| 5,598,825 A | 2/1997 | Neumann | |
| 5,633,458 A | 5/1997 | Pauli et al. | |
| 5,682,864 A | 11/1997 | Shirakawa | |
| 5,735,253 A | 4/1998 | Perotto et al. | |
| 5,740,667 A | 4/1998 | Bhattacharyya et al. | |
| 5,762,366 A | 6/1998 | Faye | |
| 5,857,445 A | 1/1999 | Shimada et al. | |
| 6,024,069 A | 2/2000 | Yoshino | |
| 6,058,906 A | 5/2000 | Yoshino | |
| 6,088,647 A | 7/2000 | Hemberger et al. | |
| 6,176,215 B1 | 1/2001 | Baur et al. | |
| 6,213,104 B1 | 4/2001 | Ishikiriyama et al. | |

(Continued)

FOREIGN PATENT DOCUMENTS

EP   2 048 339 A1   4/2009

(Continued)

OTHER PUBLICATIONS

Leone, Thomas G., et al., "Method for Operating a Charge Diluted Engine" U.S. Appl. No. 12/756,822, filed Apr. 8, 2010, 87 Pgs.

(Continued)

*Primary Examiner* — Erick Solis
(74) *Attorney, Agent, or Firm* — Allan J. Lippa; Allamen Hall McCoy Russell & Tuttle LLP

(57) ABSTRACT

A method for operating an engine with a fuel reformer is presented. In one embodiment a method for operating an engine by injecting a gaseous fuel and a liquid fuel to at least an engine cylinder is presented. The mixture of an engine cylinder may be diluted with EGR and a fraction of gaseous fuel may be increased relative to a fraction of liquid fuel injected to a cylinder in response to an operator tip-out.

20 Claims, 11 Drawing Sheets

U.S. PATENT DOCUMENTS

| | | | |
|---|---|---|---|
| 6,247,449 | B1 | 6/2001 | Persson |
| 6,318,306 | B1 | 11/2001 | Komatsu |
| 6,334,424 | B1 | 1/2002 | Ito |
| 6,349,702 | B1 | 2/2002 | Nishiyama |
| 6,390,030 | B1 | 5/2002 | Isogawa et al. |
| 6,591,817 | B2 | 7/2003 | Deutsch |
| 6,705,295 | B1 | 3/2004 | Tarroux et al. |
| 6,711,893 | B2 | 3/2004 | Ueda et al. |
| 6,729,301 | B2 | 5/2004 | Nakamori et al. |
| 6,751,543 | B2 | 6/2004 | Gras et al. |
| 6,851,398 | B2 | 2/2005 | Taylor, III et al. |
| 6,964,261 | B2 | 11/2005 | Warne et al. |
| 6,988,481 | B2 | 1/2006 | Sen et al. |
| 6,990,956 | B2 | 1/2006 | Niimi |
| 6,997,142 | B2 | 2/2006 | Wakao et al. |
| 7,047,940 | B2 | 5/2006 | Niimi |
| 7,089,888 | B2 | 8/2006 | Mirji |
| 7,104,244 | B2 | 9/2006 | Nishi et al. |
| 7,159,541 | B2 | 1/2007 | Wakao et al. |
| 7,203,579 | B2 | 4/2007 | Yokota et al. |
| 7,228,841 | B2 | 6/2007 | Takemoto et al. |
| 7,261,065 | B2 | 8/2007 | Aimoto et al. |
| 7,290,522 | B2 * | 11/2007 | Heywood et al. ............ 123/300 |
| 7,370,609 | B2 | 5/2008 | Kamio |
| 7,454,898 | B2 | 11/2008 | Allgeier et al. |
| 7,523,744 | B2 | 4/2009 | Ayame |
| 7,530,335 | B2 | 5/2009 | Sakurai et al. |
| 7,581,528 | B2 * | 9/2009 | Stein et al. .................... 123/431 |
| 7,703,445 | B2 * | 4/2010 | Haga .............................. 123/525 |
| 2001/0003977 | A1 | 6/2001 | Hayashi et al. |
| 2004/0099226 | A1 * | 5/2004 | Bromberg et al. ................. 123/3 |
| 2004/0139944 | A1 | 7/2004 | Nakano et al. |
| 2008/0010993 | A1 | 1/2008 | Morgenstern |
| 2008/0098985 | A1 | 5/2008 | Kamio |
| 2008/0141984 | A1 | 6/2008 | Haga |
| 2008/0221778 | A1 | 9/2008 | Kakuho et al. |
| 2008/0228375 | A1 | 9/2008 | Ashida et al. |
| 2008/0282998 | A1 | 11/2008 | Kuzuoka et al. |
| 2009/0017987 | A1 | 1/2009 | Satou et al. |
| 2009/0030588 | A1 | 1/2009 | Yamashita |
| 2009/0043479 | A1 | 2/2009 | Noda et al. |
| 2009/0065409 | A1 | 3/2009 | Kamio et al. |
| 2009/0071453 | A1 | 3/2009 | Stockhausen et al. |

FOREIGN PATENT DOCUMENTS

| | | |
|---|---|---|
| KR | 2001-0023298 | 3/2001 |

OTHER PUBLICATIONS

Leone, Thomas G., et al. "Method for Operating and Engine with Variable Charge Density" U.S. Appl. No. 12/756,800, filed Apr. 8, 2010, 87 Pgs.

Leone, Thomas G., et al., "Pump Control for Reformate Fuel Storage Tank" U.S. Appl. No. 12/756,827, filed Apr. 8, 2010, 24 Pgs.

Czekala, Michael D., et al., "Ignition Control for Reformate Engine" U.S. Appl. No. 12/756,792, filed Apr. 8, 2010, 32 Pgs.

Pursifull, Ross D., "Fuel Injector Diagnostic for Dual Fuel Engine" U.S. Appl. No. 12/756,838, filed Apr. 8, 2010, 35 Pgs.

Pursifull, Ross D., "Engine Fuel Reformer Monitoring" U.S. Appl. No. 12/756,845, filed Apr. 8, 2010, 37 Pgs.

Left Blank Intentionally.

Leone, Thomas G., "Operating and Engine with Reformate" U.S. Appl. No. 12/756,883, filed Apr. 8, 2010, 48 Pgs.

Leone, Thomas G., et al., "Method for Operating a Vehicle with a Fuel Reformer" U.S. Appl. No. 12/756,892, filed Apr. 8, 2010, 86 Pgs.

Pursifull, Ross D., "Method for Operating an Engine" U.S. Appl. No. 12/756,809, filed Apr. 8, 2010, 87 Pgs.

Pursifull, Ross D., et al., "Selectively Storing Reformate" U.S. Appl. No. 12/756,853, filed Apr. 8, 2010, 33 Pgs.

Leone, Thomas G., "Reformate Control Via Accelerometer" U.S. Appl. No. 12/756,897, filed Apr. 8, 2010, 33 Pgs.

Kerns, James, et al., "Method for Operating an Engine with a Fuel Reformer" U.S. Appl. No. 12/756,858, filed Apr. 8, 2010, 33 Pgs.

Kamio, Junichi, et al., "Study on HCCI-SI Combustion Using Fuels Containing Ethanol", SAE Technical Paper Series No. 2007-01-4051, Powertrain & Fluid Systems, Conference & Exhibition, Rosemont, IL, Oct. 29-Nov. 1, 2007, 12 Pgs.

Hoffmann, Walter, et al., "A New Approach to Ethanol Utilization: High Efficiency and Low Nox in an Engine Operating on Simulated Reformed Ethanol", SAE Technical Paper Series No. 2008-01-2415, Powertrain, Fuels, & Lubricants Meeting, Rosemont, IL, Oct. 6-9, 2008, 11 Pgs.

Morgenstern, David A., et al., "Low Temperature Reforming of Ethanol over Copper-Plated Randy Nickel: A New Route to Sustainable Hydrogen for Transportation" revised manuscript received May 4, 2005, pp. 9.

Green Car Congress, "Honda Making Significant Progress on HCCI Engine for Hybrid Application" Oct. 28, 2009, http://www.greencarcongress.com/2005/10/honda_making_si.html, 8 Pgs.

ISA Korean Intellectual Property Office, International Search Report of PCT/US2011/031097, Dec. 7, 2011, 5 pages.

* cited by examiner

METHOD FOR IMPROVING TRANSIENT ENGINE OPERATION

FIELD

The present description relates to a method for improving fuel control of an engine. The method may be particularly useful for controlling fuel to an engine that may operate using two fuels.

BACKGROUND AND SUMMARY

An engine may be operated with charge dilution to lower engine emissions and improve fuel economy. Charge dilution can reduce engine pumping work and cylinder combustion temperature, thereby improving engine operation. However, if an engine is operated at a high level of charge dilution and there is a rapid change in operating conditions (e.g., a change in engine load), the engine may suffer poor combustion stability and/or misfire, thereby causing poor drivability and/or increasing engine emissions.

The inventors herein have recognized the above-mentioned disadvantages and have developed a method for improving engine operation during transient operating conditions. One embodiment of the present description includes a method for operating an engine, comprising: operating an engine by injecting a gaseous fuel and a liquid fuel to at least an engine cylinder; diluting a mixture of at least an engine cylinder; and increasing a fraction of gaseous fuel relative to a fraction of liquid fuel injected to a cylinder in response to an operator tip-out.

By increasing injection of a gaseous fuel during a transient engine operating condition it may be possible to reduce engine misfires when the engine is operating at a higher dilution level. Further, an engine may be operated at higher dilution levels to improve fuel economy and emissions, at least under some conditions, when combustion stability can be improved during transient engine operating conditions. Increasing combustion stability can reduce the possibility of poor combustion stability and/or engine misfires, thereby improving drivability and/or decreasing engine emissions.

The present description may provide several advantages. Specifically, the approach may allow an engine to operate at higher charge dilution levels. As such, engine efficiency may be improved by the following method. Further, the method may reduce engine emissions during transient operating conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
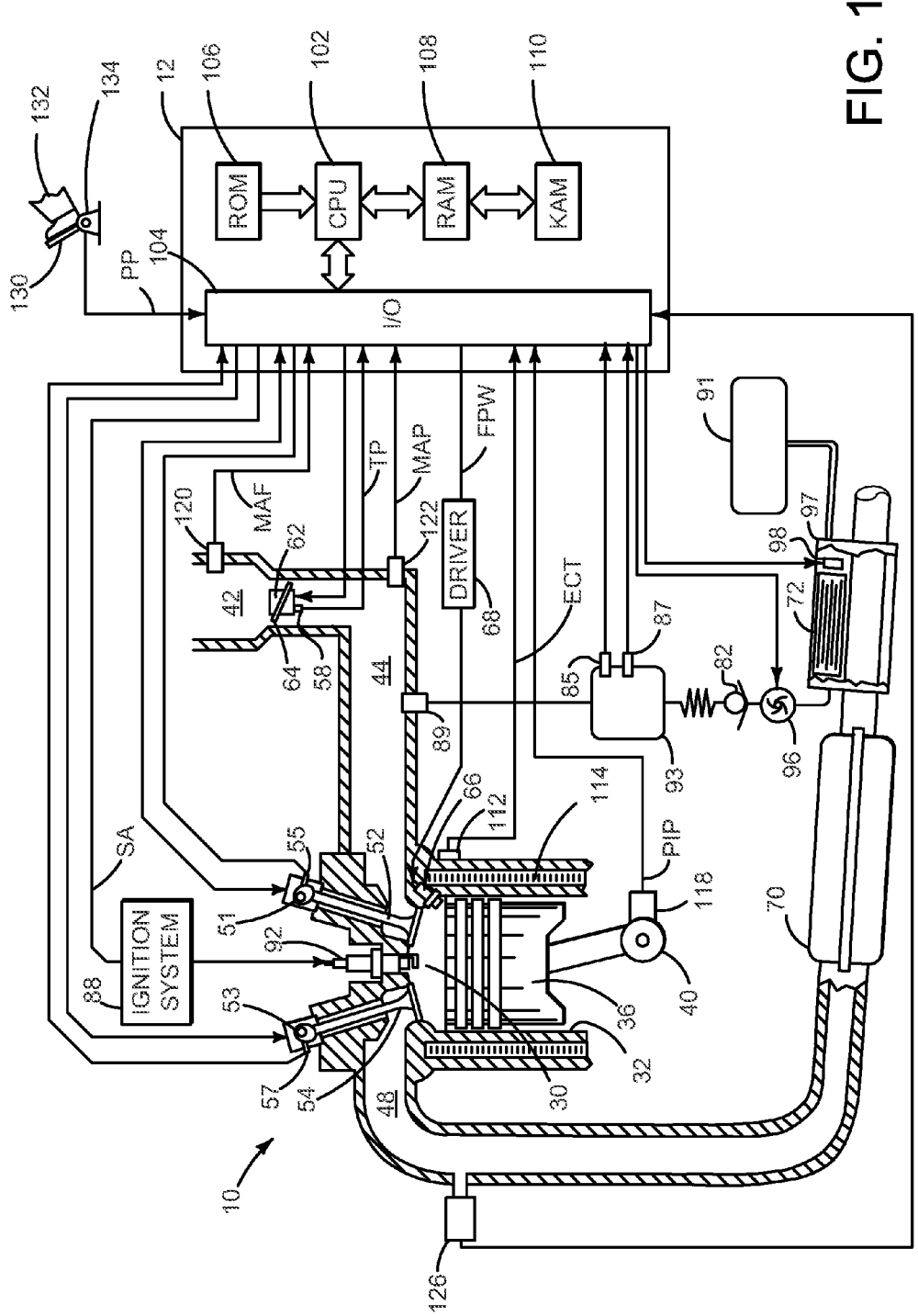
FIG. 1 is a schematic diagram of an engine.
Figure 2:
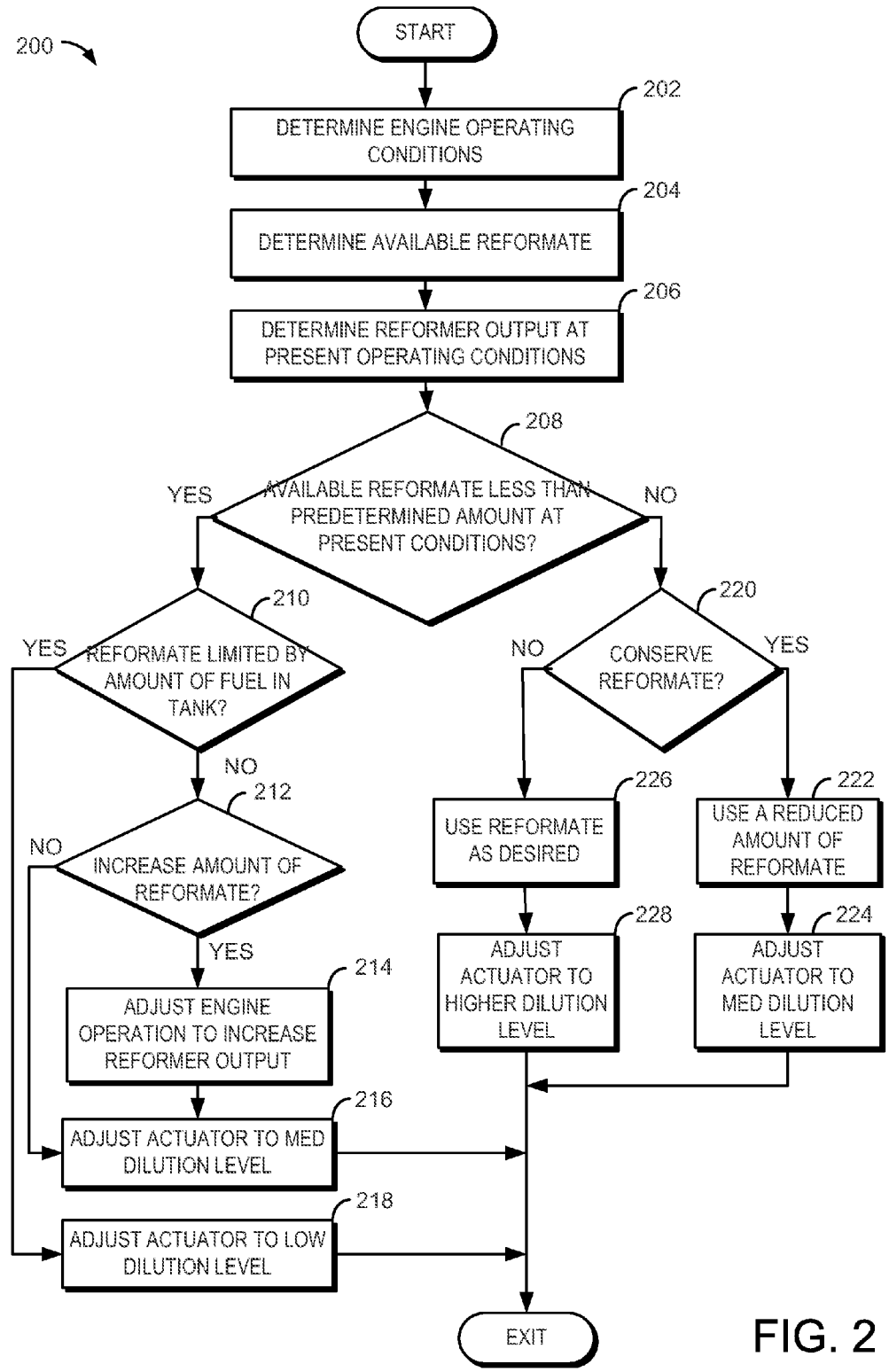
FIG. 2 is a flow chart for an engine dilution routine.
Figure 3:
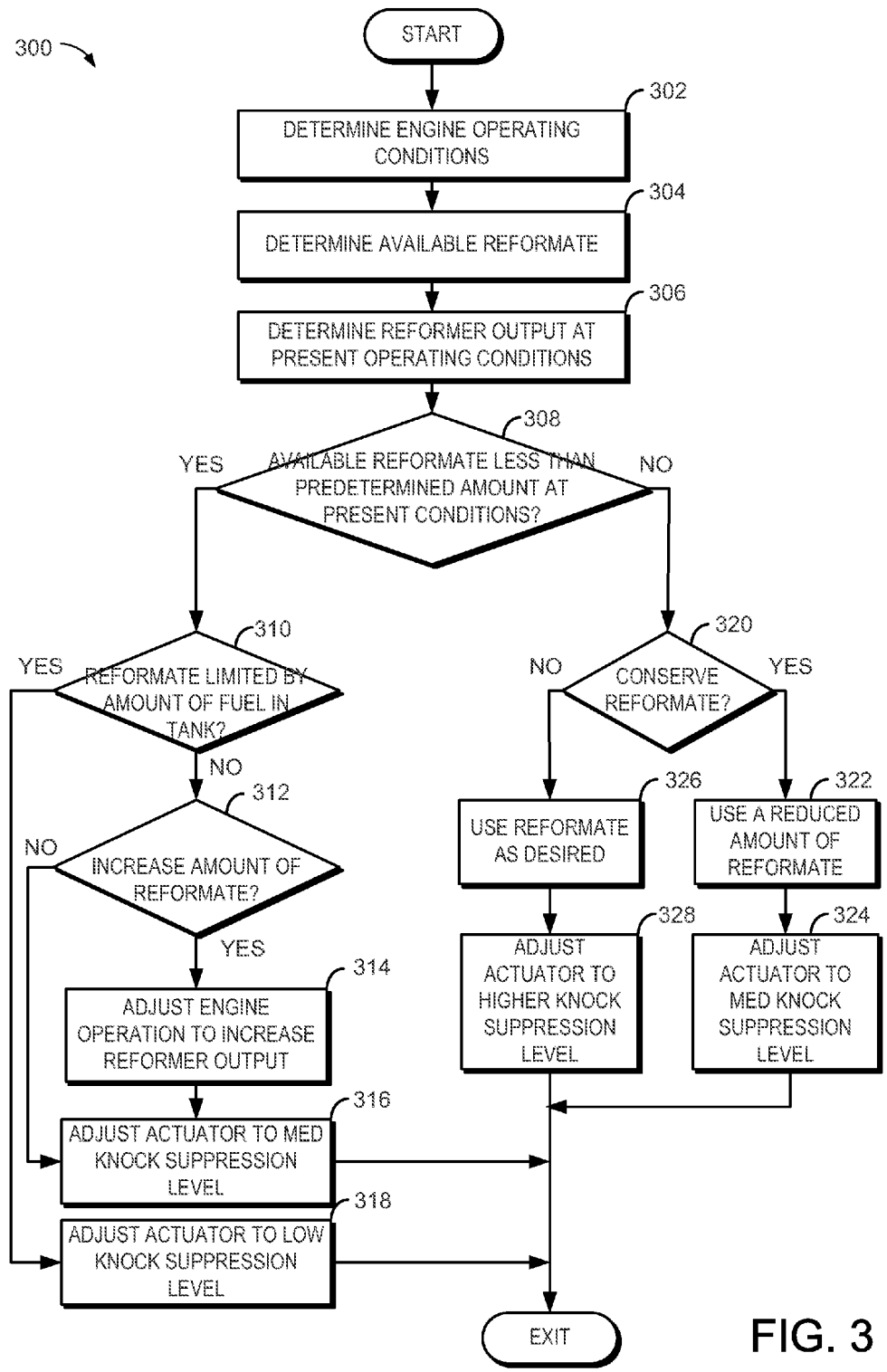
FIG. 3 is a flow chart for an engine knock control routine.
Figure 4:
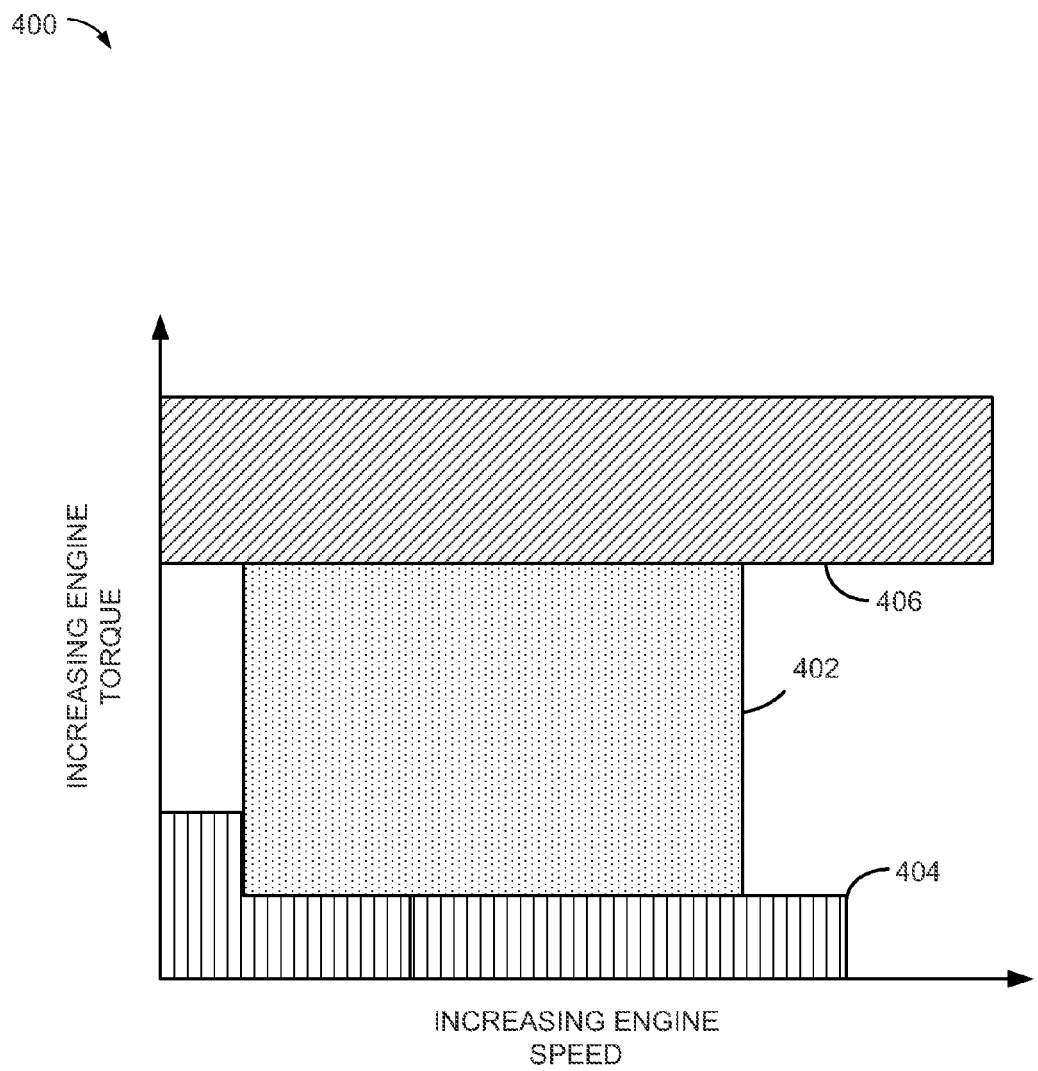
FIG. 4 is an example plot of a simulated engine operating map.
Figure 5:
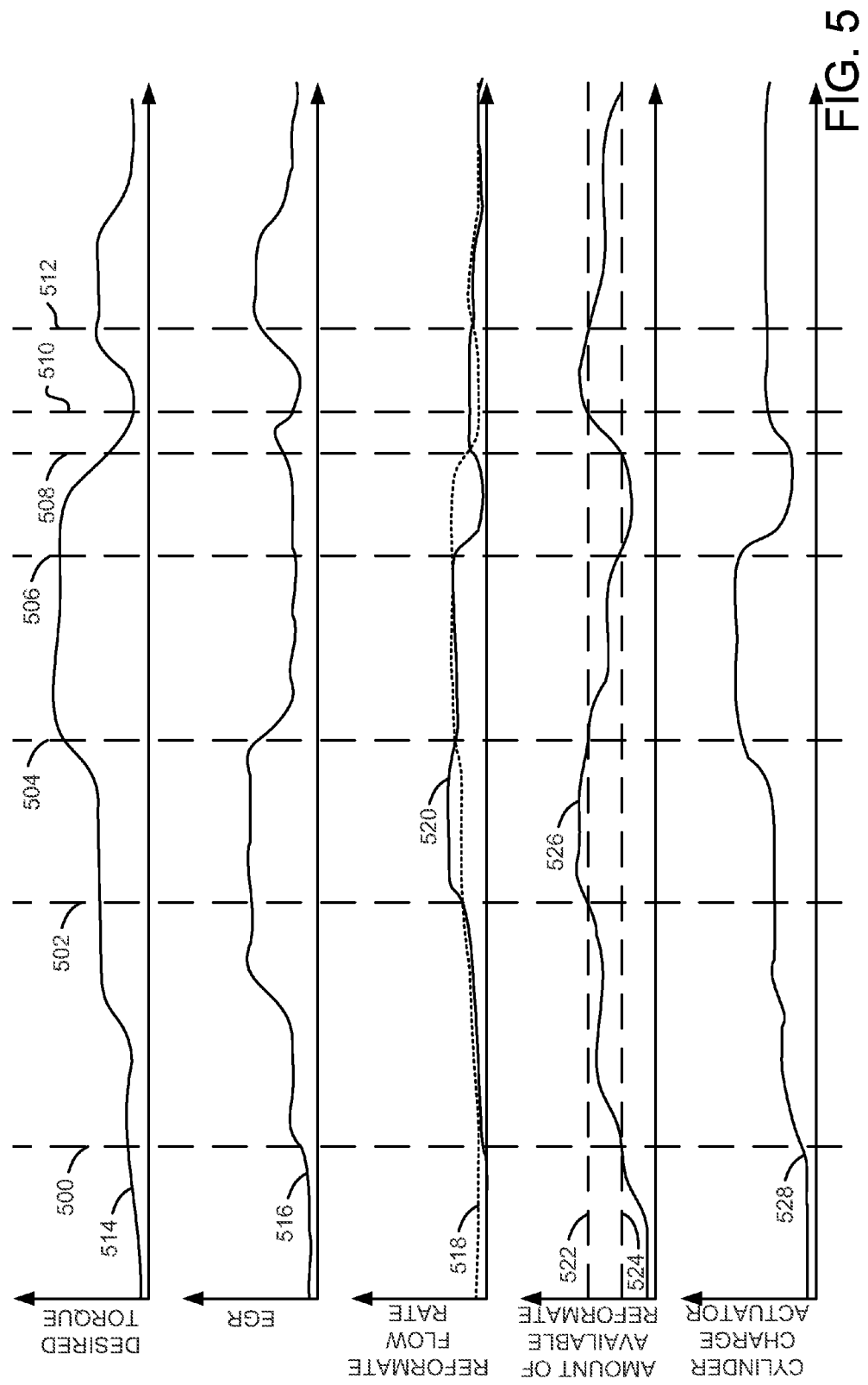
FIG. 5 is a simulated example plot of signals of interest operating an engine by the methods of FIGS. 2 and 3.
Figure 10:
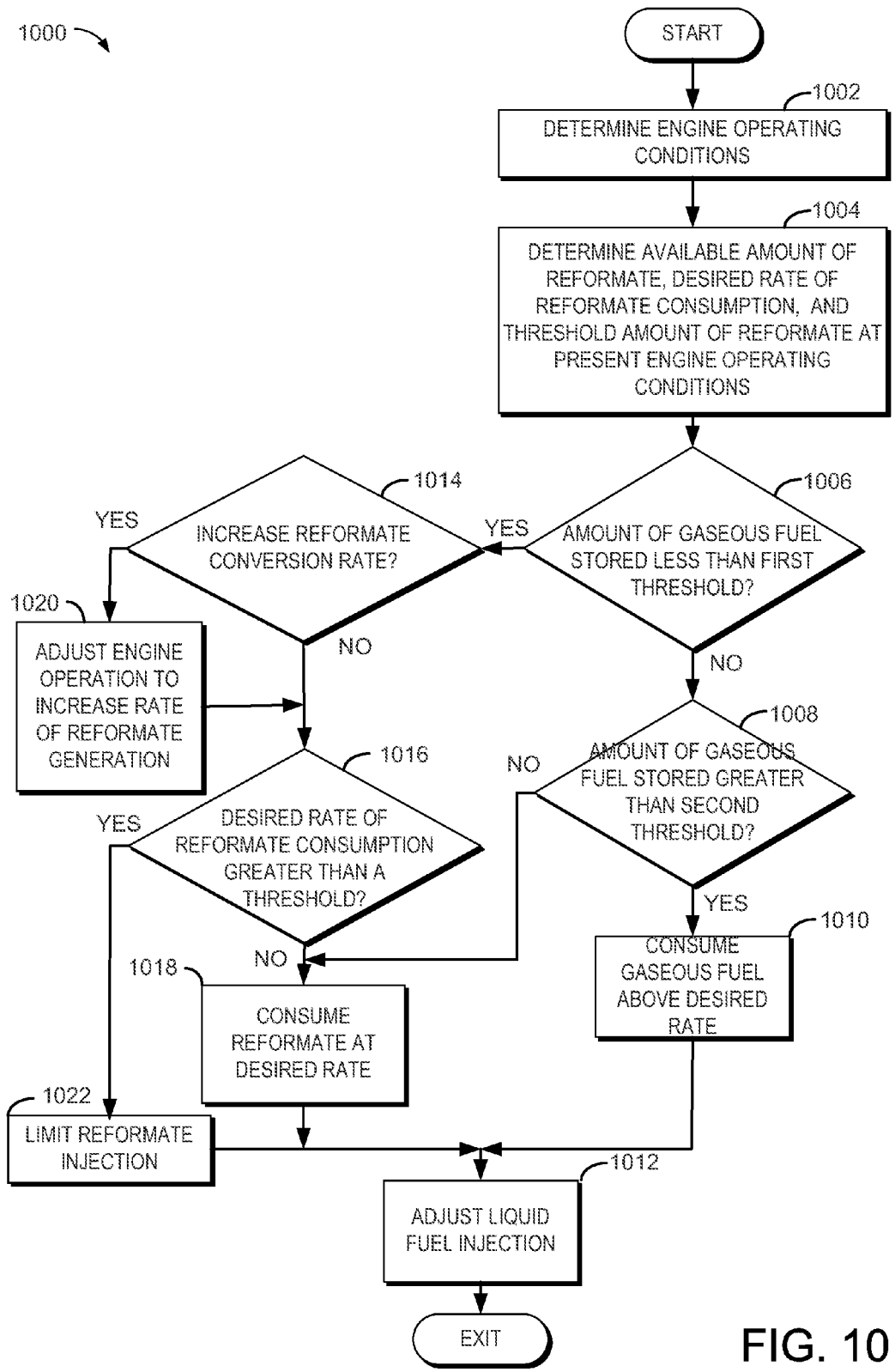
FIG. 10 is a flow chart for a reformate prioritization.
Figure 11:
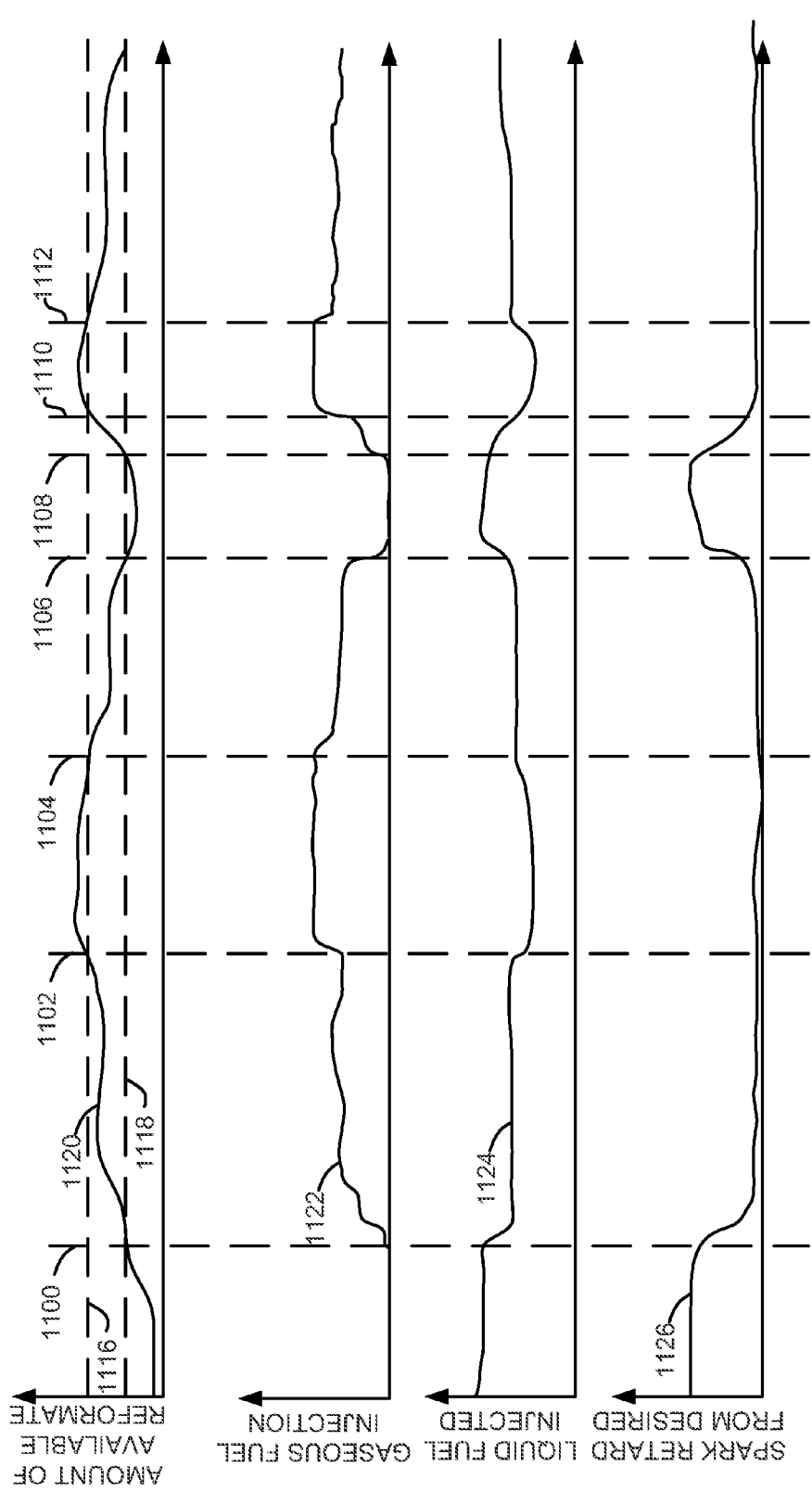
FIG. 11 is an example plot of simulated signals of interest when use of reformate is prioritized by the method of FIG. 10.

The present description is related to operating an engine with a fuel reformer. In one embodiment, the engine may be configured with variable valve timing and spark ignition as is illustrated in FIG. 1. The fuel reformer may allow the engine to operate with higher charge dilution (e.g., leaner or with additional EGR) and with higher density cylinder mixtures. FIGS. 2 and 3 show routines of example dilution and knock control routines that may be used to take advantage of reformate produced by the fuel reformer. FIGS. 4 and 5 show example engine operating regions and signals of interest when operating an engine with reformate. FIGS. 6-9 show example routines and engine air-fuel signals of interest when operating an engine with reformate. FIGS. 10-11 show an example routine and engine signals of interest when prioritizing reformate use for improving operation of an engine and conserving reformate.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system including fuel tank 91, fuel pump (not shown), fuel lines (not shown), and fuel rail (not shown). The engine 10 of FIG. 1 is configured such that the fuel is injected directly into the engine cylinder, which is known to those skilled in the art as direct injection. Alternatively, liquid fuel may be port injected. Fuel injector 66 is supplied operating current from driver 68 which responds to controller 12. In addition, intake manifold 44 is shown communicating with intake plenum 42 via optional electronic throttle 62. Throttle plate 64 controls the flow of air through electronic throttle 62. In one example, a low pressure direct injection system may be used, where fuel pressure can be raised to approximately 20-30 bar. Alternatively, a high pressure, dual stage, fuel system may be used to generate higher fuel pressures.

Gaseous fuel may be injected to intake manifold 44 by way of fuel injector 89. In another embodiment, gaseous fuel may be directly injected into cylinder 30. Gaseous fuel is supplied to fuel injector 89 from storage tank 93 by way of pump 96 and check valve 82. Pump 96 pressurizes gaseous fuel supplied from fuel reformer 97 in storage tank 93. Check valve 82 limits flow of gaseous fuel from storage tank 93 to fuel reformer 97 when the output of pump the 96 is at a lower pressure than storage tank 93. Fuel reformer 97 includes catalyst 72 and may further include optional electrical heater 98 for reforming alcohol supplied from fuel tank 91. Fuel tank 91 may be configured to hold alcohol or a mixture of gasoline and alcohol. In some embodiments, alcohol may be separated from a gasoline/alcohol mixture before entering fuel reformer 97. Fuel reformer 97 is shown coupled to the exhaust system downstream of catalyst 70 and exhaust manifold 48. However, fuel reformer 97 may be coupled to exhaust manifold 48 and located upstream of catalyst 70. Fuel reformer 97 may use exhaust heat to drive an endothermic dehydrogenation of alcohol supplied by fuel tank 91 and to promote fuel reformation.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of fuel reformer tank pressure from pressure sensor 85; a measurement of fuel reformer tank temperature from temperature sensor 87; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the crankshaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring to FIG. 2, a flow chart for an engine dilution control routine is shown. At 202, routine 200 determines engine operating conditions. Engine operating conditions may include but are not limited to engine speed; engine load (e.g., engine load may be expressed at the amount of air charge of engine cylinders divided by the theoretical maximum air charge that a cylinder may hold at a defined pressure); ambient temperature, pressure, and humidity; and engine torque request (e.g., desired engine torque). Routine 200 proceeds to 204 after engine operating conditions are determined At 204, routine 200 determines the available amount of reformate (e.g., $H_2$, $CH_4$, and CO). In one embodiment, the amount of available reformate may be determined from the temperature and pressure of a reformate storage tank (e.g., element 93 of FIG. 1). Thus, the amount of available reformate may be determined from the ideal gas law (e.g., pV=nRT where p is the absolute pressure of a gas, V is the volume of gas, n is the number of moles of the gas, R is the gas constant, and T is the gas temperature). However, the reformate tank may contain a mixture of vaporized ethanol and reformate. Therefore, it may be desirable to determine what fraction of gas held in the reformate tank is vaporized ethanol and what fraction of gas is reformate and then determine the partial pressures of the gases to determine the amount of available reformate.

In one example, the concentration of reformate stored in the reformate tank may be determined after the engine has been operated solely by injecting liquid fuel and operating the engine under substantially stoichiometric conditions. In particular, the amount of reformate stored in the fuel tank may be determined after the engine controller adapts to air and fuel conditions so that there is substantially no error between the desired engine air amount and the actual engine air amount, and so that there is substantially no error between the desired liquid fuel amount and the actual engine fuel amount. After errors have been adapted out of the control system when the engine is operated solely with liquid fuel, the engine is operated under substantially the same stoichiometric conditions. Further, the cylinder air amount is increased based on the volume of gaseous fuel injected to the engine (note that gaseous injectors meter gas based on volume rather than mass), assuming the gaseous fuel is composed of solely reformate or some other proportion of reformate (e.g., 50% reformate/ 50% vaporized ethanol). In one embodiment, if the injected gaseous fuel is comprised solely of reformate, the adjustments of gaseous fuel and cylinder air amount adjustment result in a substantially stoichiometric air-fuel mixture which is reflected in the exhaust gas oxygen concentration. During such conditions, an adaptive fuel control multiplier has a value of 1. Note that the adaptive multiplier is a multiplier to fuel and/or cylinder air charge that adjusts injector timing and/or throttle position so that the air-fuel ratios of engine cylinders are substantially stoichiometric. However, if the injected gaseous fuel is comprised of vaporized ethanol or of a mixture of vaporized ethanol and reformate, the adaptive fuel control multiplier may approach a value of 0.33. The adaptive fuel controller may approach 0.33 because the volume based stoichiometric air-fuel ratio of reformate is three times greater than that of vaporized ethanol. As a result, the fraction of reformate may be determined from the adaptive fuel multiplier and interpolating between 0.33 (ethanol) and 1 (reformate). Then the partial pressures of each gas and the ideal gas law may be used to determine the amount of reformate stored in the reformate tank.

In an alternative example, the method described in U.S. Pat. No. 6,644,097 may be used to determine the content of the gaseous fuel mixture. After determining the amount of reformate available, routine 200 proceeds to 206.

At 206, routine 200 determines the amount of fuel reformer output at the present operating conditions. In one example, the fuel reformer output may be determined from empirical data based on the temperature of the fuel reformer and the flow rate of fuel into or through the fuel reformer. In particular, a map of fuel reformer output may be stored in memory. The map may be indexed based on fuel reformer temperature and fuel flow rate into or through the fuel reformer.

In one example, the temperature of the fuel reformer may be measured by a thermocouple or thermistor. In an alternative embodiment, fuel reformer temperature may be inferred from engine temperature, engine speed, spark timing, and engine mass flow rate. For example, empirical data representing fuel reformer temperature may be stored in a table indexed with engine speed and engine mass flow rate. Data may be extracted from the table and then modified by engine temperature and engine spark timing. In one example, when engine spark is retarded from minimum spark for best torque (MBT) or from knock limited spark, fuel reformer output of reformate may be increased in relation to the number of angular degrees spark is retarded from MBT or knock limited spark.

The fuel flow rate to the fuel reformer may be determined by from the duty cycle of a valve or injector or from the opening duration of a valve or injector that supplies fuel to the fuel reformer. In an alternative embodiment, the fuel flow rate to the fuel reformer may be determined from a fuel flow meter. The fuel reformer output map may then be indexed by the fuel flow rate and the fuel reformer temperature to determine the rate that the fuel reformer outputs gaseous fuel.

In an alternative embodiment, the gaseous fuel injector may be deactivated and the fuel reformer tank pressure may be monitored over a period of time to establish the rate of pressure rise in the tank, thereby indicating the fuel reformer rate of gaseous fuel generation. The rate that reformate is produced may be determined from the rate of pressure change in the reformate storage tank and the ideal gas law. In particular, $V \cdot dp/dt = dn/dt \cdot RT$ may be solved for $dn/dt$. Further, as previously discussed, the partial pressures of reformate and vaporized ethanol may be determined from an adaptive fuel parameter so that the amount of pressure increase attributable to reformate may be determined. In this way, the rate of fuel reformer output may be determined After the fuel reformer output rate is determined, routine 200 proceeds to 208.

At 208, routine 200 judges whether the amount of available reformate is an amount that is less than predetermined first threshold amount of reformate. Since reformate is stored in a tank, the predetermined amount of reformate may be expressed as a mass of reformate stored in the reformate storage tank. The mass of available reformate may be determined based on temperature and the partial pressure of reformate stored in the reformate storage tank. In one embodiment, the predetermined amount of reformate is a mass of reformate used to execute one or more engine operations at a desired rate of reformate use. For example, the predetermined amount of reformate may be expressed as the mass of reformate used to accelerate a vehicle at a specified rate for a specified amount of time when the desired amount of reformate is injected to the engine at present engine operating conditions. In another example, the predetermined amount of reformate may be expressed as the mass of reformate used to cold start the engine one or more times when the desired amount of reformate is injected to the engine. In still another example, the predetermined amount of reformate may be expressed as the mass of reformat used to operate the engine at a particular load for a particular amount of time when the desired amount of reformate is injected to the engine. It should also be mentioned that the predetermined amount of reformate may vary depending on engine operating conditions. For example, if ambient temperature is low, the predetermined amount of reformate may be set to a first level. If ambient temperature is higher, the predetermined amount of reformate may be set to a second level, the second level higher than the first level. By adjusting the predetermined amount of reformate to different levels, it is possible to conserve reformate when ambient temperature is low when it may be more difficult to produce reformate.

In one embodiment, a desired amount of reformate at particular engine operating conditions may be empirically determined based on combustion stability and engine emissions. Combustion stability and engine emissions may be related to the state of engine actuators such as EGR valves, camshaft timing, valve lift, fuel injection timing, engine speed, and engine load. Increasing charge dilution may increase engine efficiency and produce lower emissions because increased cylinder charge dilution may lower peak cylinder pressures and permits the engine to operate with less throttling. However, higher levels of cylinder charge dilution may cause combustion instability and increased engine emissions. Therefore, a gasoline fueled engine may be limited to between 5% and 25% dilution to reduce the possibility of engine misfires and reduced combustion stability. Injecting reformate to engine cylinders may improve combustion stability such that cylinder charge dilution may be increased. Reformate increases combustion flame speed, thereby improving combustion stability when cylinder contents are highly dilute. Thus, cylinder charge dilution may be increased when reformate is combusted in engine cylinders as compared to when an engine is operated solely with gasoline or ethanol. As such, additional EGR or leaner air-fuel ratios may be tolerated by the engine without a decrease in combustion stability when reformate is added to cylinder air-fuel mixtures.

The desired amount of reformate may be based on an amount of reformate that provides a specific level of combustion stability and a level of emissions. Therefore, the amount of reformate combusted by an engine may vary depending on engine speed and load. In addition, it may be that use of additional reformate further improves combustion stability and emissions at a first engine operating condition (e.g., a first engine speed and load); however, it may be desirable to use less reformate at the first engine operating condition than an amount of reformate that provides a higher level of combustion stability during some conditions so that fuel economy may be increased or so that reformate may be conserved for engine operating conditions where reformate may have greater benefit (e.g., engine operating conditions where lower amounts or reformate provide greater levels of combustion stability, lower emissions, and greater fuel economy). Thus, the desired amount of reformate at the present engine operating conditions may depend on a variety of factors. Therefore, the desired amount of reformate may be empirically determined and stored in memory of an engine controller. In one example, the desired amount of reformate is stored in a table that is indexed by engine speed and load.

If the available amount of reformate is less than the threshold amount of reformate at the present engine operating conditions, routine 200 proceeds to 210. Otherwise, routine 200 proceeds to 220. In another embodiment, if the available amount of reformate is less than the threshold amount of reformate or if the available amount of reformate is less than an amount of reformate desired to operate the engine under the present operating conditions for a predetermined amount of time, routine 200 proceeds to 210. Otherwise, routine 200 proceeds to 220. Thus, in one embodiment, routine 200 may proceed to 210 if the available amount of reformate is less than the threshold amount of reformate and if there is less than a predetermined amount of reformate stored in the reformate storage tank as reserve.

At 220, routine 200 judges whether or not to conserve reformate at the present engine operating conditions. In one example, routine 200 may judge to use less reformate than is presently being produced by the fuel reformer when introducing additional reformate to the engine air-fuel mixture provides less benefit than an engine operating condition that provides increased benefits for adding additional reformate to the cylinder air-fuel mixture. For example, if at low to medium engine load (e.g., 0.2-0.4) and low engine speed (e.g., 700 RPM), the fuel reformer outputs X grams of fuel and the engine consumes 0.95·X fuel to provide a desired level of combustion stability and emissions, 5% of the amount of fuel produced by the fuel reformer may be added to storage rather than marginally improving combustion stability and emissions. The 5% may then be used at higher engine speeds and loads (e.g., 0.35-0.6 load and 1500-3500 RPM) to improve engine emissions and fuel economy when the engine may use reformate to greater benefit.

In another example, reformate may be conserved to an amount that a permits the engine to be restarted one or a predetermined number of times. For example, if the level of liquid fuel in the liquid fuel tank is below a threshold amount, the threshold amount a minimum liquid fuel amount where operation of the fuel reformer is allowed, then reformate stored in the reformate tank may be stored and used solely for restarting the engine. In another example, reformate may be stored until the engine is operated above a predetermine engine load when fuel reformer operating conditions are such that fuel reformer efficiency is low. Thus, reformat may be stored and used for selected conditions. If routine judges to conserve reformate, routine 200 proceeds to 222. Otherwise, routine 200 proceeds to 226.

At 222, routine 200 reduces the amount of reformate injected to the engine to an amount less than the desired amount of reformate. In one embodiment, reformate may be reduced by an empirically determined predetermined fraction. For example, if fuel reformer efficiency is low at the present engine operating condition and the engine has been operating at the operating condition for more than a predetermined amount of time, the amount of reformate injected to the engine may be reduced by a predetermined amount (e.g., 10%, 20%, 50%) to conserve reformate. Further, the amount that reformate injected to the engine is reduced may be scalable as engine and fuel reformer operating conditions vary. For example, operating an engine and fuel reformer at a particular set of operating conditions may initially result in a reduction of 10% in reformate injected to the engine. However, if the engine and fuel reformer continue to operate at the same conditions for more than a predetermined amount of time, the amount of reformate injected to the engine may be reduced by 20%, for example. Note that the amount of reformate used may be reduced to zero. Routine 200 proceeds to 224 after the amount of reformate injected to the engine is decreased.

At 224, routine 200 adjusts actuators to account for the reduction of reformate so that combustion stability and engine emissions may not deteriorate more than a desired amount. Cylinder charge dilution may be reduced by adjusting camshaft timing (e.g., valve timing), valve lift, and/or EGR valve position. Further, spark timing and fuel injection timing may also be adjusted in response to reducing the amount of reformate injected to the engine. Routine 200 proceeds to exit after adjusting actuators.

At 226, routine 200 supplies the desired amount of reformate to the engine. Since it may be judged that there is sufficient reformate to operate the engine as desired, reformate is injected to the engine at the desired amount. In another example, it may be desirable under some engine operating conditions to use more reformate than the desired amount. Under these conditions it is also possible to increase the amount of reformate injected to the engine to an amount greater than the desired amount. For example, it may be desirable to extract additional heat from engine exhaust during some engine operating conditions to reduce temperatures of exhaust after treatment devices. By increasing the use of reformate and increasing the amount of fuel delivered to the fuel reformer, it may be possible to extract additional heat from engine exhaust. In another example, the amount of gaseous injected to the engine may be increased to a level greater than the desired reformate flow rate when the amount of reformate stored in the reformate storage tank exceeds a second threshold amount. Thus, the amount of reformate stored in the reformate storage tank may be regulated by injecting additional reformate to the engine when the amount of stored reformate is greater than a second threshold amount.

At 228, routine 200 adjusts engine actuators to increase cylinder charge dilution up to a level where engine combustion stability and emissions are at a desired level. As discussed at 208, the desired level of charge dilution may be empirically determined and stored in engine controller memory. Cylinder charge dilution may be varied by adjusting camshaft timing (e.g., valve timing), valve lift, and EGR valve position according to engine speed, engine load, and amount or reformate injected to the engine. Further, during some conditions the amount of reformate consumed may be increased by retarding cylinder spark advance so that the engine operates less efficient, during a cold start for example. After adjusting actuator operation to account for the amount of reformate injected to the engine, routine 200 proceeds to exit.

At 210, routine 200 judges whether reformate production is limited by the amount of liquid fuel in the liquid fuel storage tank. In one embodiment, operation of the fuel reformer may be limited or inhibited when an amount of liquid fuel in the liquid fuel storage tank is less than a predetermined level. For example, if the amount of fuel stored in the liquid fuel storage tank is less than twenty-five percent of storage capacity, reformate output may be reduced by ten percent. And, if the amount of fuel stored in the liquid fuel storage tank is less than twenty percent of storage capacity, fuel reformer output may be reduced by twenty-five percent. Note that fuel reformer output may be reduced to zero under some conditions. If routine 200 judges to reduce the rate of reformate production, routine 200 proceeds to 218. Otherwise, routine 200 proceeds to 212.

At 212, routine 200 judges whether or not to increase fuel reformer output. In one example, routine 200 may increase fuel reformer output when engine efficiency is reduced by less than a predetermined amount at the requested engine torque demand. Engine efficiency reduction may be estimated based on the amount of spark retard and by the additional fuel consumed by operating the engine at less than MBT or knock limited conditions. In one embodiment, engine efficiency loss may be empirically determined by operating the engine on a dynamometer and adjusting spark timing while maintaining a desired engine torque by increasing engine air flow and fuel. The empirically determined efficiency loss may be stored within engine controller memory and indexed by spark retard, engine speed, and engine load. When routine 212 judges to increase the amount of reformate produced by the fuel reformer, routine 200 proceeds to 214. Otherwise, routine 200 proceeds to 214.

At 214, engine operation is adjusted to increase fuel reformer output. In one example, routine 200 may increase fuel reformer output by increasing the amount of liquid fuel (e.g. alcohol) delivered to the fuel reformer. The amount of liquid fuel delivered to the fuel reformer may be regulated by controlling a pump or by controlling a position of a valve. Further, fuel reformer output may be increased during some conditions by increasing engine spark retard and increasing engine air flow so as to increase the efficiency and temperature of the fuel reformer. After adjusting engine operation to increase fuel reformer output routine 200 proceeds to 216.

At 216, engine actuators are adjusted so that cylinder charge dilution is at a level less than that which provides a desired level of combustion stability and engine emissions when the desired amount of reformate is available at the present engine speed and load. In one embodiment, the state of actuators may be controlled according to output of one or more actuator tables that contain empirically determined states for actuators that may be used to adjust cylinder charge dilution. The tables may be indexed by the amount of reformate injected to the engine, the amount of available reformate, engine speed, and engine load. Actuator state control tables may be provided for EGR valves, camshaft timing, and valve lift. After the state of engine actuators has been adjusted to dilute cylinder charge to a level less than that supported when the desired amount of reformate is available, routine 200 proceeds to exit.

At 218, engine actuators are adjusted so that cylinder charge dilution is at a level less than that which provides a desired level of combustion stability and engine emissions when the desired amount of reformate is available at the present engine speed and load. Further, since the amount of reformate may be limited in response to the amount of available liquid fuel, cylinder charge dilution may be further lowered. If the amount of reformate injected to the engine is zero, then cylinder charge dilution is set at a level suitable for gasoline or a mixture of gasoline and alcohol (e.g., ethanol). In one embodiment, the state of actuators may be controlled according to output of one or more actuator tables that contain empirically determined states for actuators that may be used to adjust cylinder charge dilution. The tables may be indexed by the amount of available reformate, the amount of reformate injected, engine speed, and engine load. Actuator state control tables may be provided for EGR valves, camshaft timing, and valve lift. After the state of engine actuators has been adjusted to dilute cylinder charge to a level less than that supported when the desired amount of reformate is available, routine 200 proceeds to exit.

Referring now to FIG. 3, a flow chart for an engine knock control routine is shown. Routine 300 has several elements in common with routine 200 of FIG. 2. In particular, 202-214 are identical to 302-314. Therefore, the description of these elements is omitted for the sake of brevity. Further, 220, 226, and 222 are the same as 320, 326, and 322 so the description of these elements is also omitted for brevity.

Injecting gaseous ethanol or reformate may reduce the tendency for engine knock (e.g., automatic ignition of end gases after a spark ignition event) because both alcohol and reformate have higher octane numbers than gasoline. In addition, reformate has a higher octane number than alcohol. Therefore, cylinders may be operated under different conditions (e.g., at different pressures) depending on the type of gaseous fuel that is injected to the engine.

In one embodiment, cylinder air charge may be increased and spark timing advanced when gaseous alcohol is solely injected with or without liquid fuel. The amount of cylinder charge and spark advance that may be tolerated by the engine for a given fuel charge fraction of alcohol before onset of engine knock may be empirically determined For example, an engine may be operated on a dynamometer and engine air charge may be increased and spark advanced while the fraction of fuel charge comprising alcohol is held substantially constant until knock ensues. The engine air amount may then be stored in memory of the engine controller so that cylinder air amount for a desired fuel fraction of alcohol is known. Cylinder air amount may be adjusted by opening or closing an air inlet throttle position, adjusting valve timing by way of a cam indexer, adjusting valve lift, and increasing boost pressure from a turbocharger or compressor by way of a vane or waste gate indexer. Further, spark advance for a given engine or cylinder air amount, and fuel fraction comprising alcohol, may also be empirically determined and stored in memory.

Likewise, engine or cylinder air amount and spark advance may be empirically determined when at least a portion of gaseous fuel injected to the engine is comprised of reformate. Since reformate has a higher octane number than alcohol, the engine may be able to tolerate higher cylinder charge amounts and higher cylinder pressures when reformate is combusted in the cylinders. Accordingly, actuators such as the throttle, valve timing (e.g., camshaft position), valve lift, and boost pressure may be set to positions that increase cylinder air charge when the amount of reformate injected to the engine increases. During some conditions actuators may be adjusted to increase the cylinder air amount to levels greater than when vaporized alcohol is injected to engine cylinders.

At 328, routine 300 adjusts engine actuators to decrease the possibility of engine knock when the engine is operated with a desired amount of reformate. If it is determined that a desired amount of reformate is available, then the tendency of the engine to knock may be reduced by injecting reformate to the engine at higher engine loads. As such, the engine may be operated with higher cylinder pressures without inducing knock.

In one example, the amount of gaseous alcohol or reformate is increased as the engine torque demand increases. Further, the amount of cylinder air charge may be increased to a level that supports the desired engine torque. In one example, cylinder air charge may be increased by adjusting actuators as the fraction of reformate in the cylinder fuel charge increases. Cylinder air amount may be increased by increasing a throttle opening area, increasing boost pressure, adjusting intake and exhaust valve timing, and/or adjusting valve lift. After adjusting actuator operation to account for the amount of reformate injected to the engine, routine 300 proceeds to exit.

At 324, routine 300 adjusts actuators to limit cylinder air charge to a level that is less than the level of cylinder air charge when the desired amount of reformate is available. In one example, at a particular engine speed, the engine load may be limited in response to the amount of reformate available and to an amount of cylinder air charge that is less than an amount that may produce a cylinder pressure greater than a peak cylinder pressure. When less reformate than a desired amount of reformate is available to inject to engine cylinders, cylinder air charge may be limited by adjusting actuators that may affect the amount of cylinder air charge. For example, the throttle opening may be limited to a predetermined amount, boost pressure may be limited to a predetermined amount, spark advance may be limited to a predetermined amount, camshaft timing may be limited to a predetermined amount, and valve lift may be limited to a predetermined amount. In one embodiment, the cylinder air amount may be limited to an amount related to the available amount of reformate. In another embodiment, where the gaseous mixture is comprised of reformate and alcohol, the cylinder air charge may be limited to a predetermined amount that is related to the fractions of alcohol and reformate comprising the gaseous fuel. For example, if the amount of reformate in the gaseous mixture is greater than the amount of alcohol, then the cylinder air charge amount may be limited to a level greater than if solely liquid fuel is injected to the engine, but less than an amount than when a desired amount of reformate is available to the engine. Thus, the amount of cylinder air charge varies from an amount when the engine is operated by solely injecting gasoline to cylinders to an amount of air charge when the engine is operated with a desired amount of reformate. In one embodiment, the percent increase in cylinder air amount may be proportional to the amount of reformate injected to the engine. After adjusting actuators to a level where the cylinder air charge is reduced along with the propensity of engine knock as compared to when the engine is operated with a desired amount of reformate, routine 300 proceeds to exit.

At 316, engine actuators are adjusted so that cylinder air charge that is less than that which is available when the engine is operated with a desired amount of reformate. In one embodiment, the state of actuators may be controlled according to output of one or more actuator tables that contain empirically determined states for actuators that may be used to adjust cylinder air amount. The tables may be indexed by the amount or percentage of desired reformate available, available reformate (e.g., the amount of reformate stored in the reformate storage tank), engine speed, and engine torque demand. Actuator state control tables may be provided for throttle position, camshaft timing, spark timing, and valve lift. After the state of engine actuators has been adjusted to limit cylinder charge to a level less than that supported when the desired amount of reformate is available, routine 200 proceeds to exit.

At 318, engine actuators are adjusted so that cylinder air charge is at a level less than that which provides all available engine torque at the present engine speed. Further, since the amount of reformate may be limited in response to the amount of available liquid fuel, cylinder charge may be further lowered to conserve reformate. If the amount of reformate injected to the engine is zero, then cylinder air charge dilution is set at a level suitable for liquid injection of gasoline or a mixture of gasoline and alcohol (e.g., ethanol). In one embodiment, the state of actuators may be controlled according to output of one or more actuator tables that contain empirically determined states for actuators that may be used to adjust cylinder air charge. The tables may be indexed by the amount of available reformate, engine speed, and engine load. Actuator state control tables may be provided for EGR valves, camshaft timing, and valve lift. After the state of engine actuators has been adjusted to limit cylinder air charge to a level less than that supported when the desired amount of reformate is available, routine 300 proceeds to exit.

Referring now to FIG. 4, plot 400 illustrates an example engine map defined by engine torque and engine speed. Areas 402-406 are shown merely for illustration purposes and are not meant to limit the scope or breadth of this description. The Y-axis represents engine torque and increases from bottom to top. The X-axis represents engine speed and increases from left to right.

Area 402 represents part load conditions when it may be desirable to operate an engine with higher levels of charge dilution. In this area, the engine may be operated at higher dilution rates because less than full engine torque is requested and because the charge dilution may increase fuel economy and reduce engine emissions.

Area 404 represents low load engine operation when less charge dilution may be desirable because combustion stability may be reduced. In addition, when the engine is operated in this region, the engine may produce less heat so that the fuel reformer efficiency is reduced. In this region, it may be desirable to heat the fuel reformer by an electrical heater so that reformate is available.

Area 406 represents engine operation at higher engine loads. In this region, it may be desirable to increase the amount of reformate combusted in engine cylinders to control engine knock. Engine knock is produced by the spontaneous combustion of cylinder end gases after a spark ignition has occurred. The cylinder gases may automatically ignite because both cylinder temperature and pressure increase in the cylinder after the air-fuel mixture in the cylinder is ignited. In this engine operating region, the fuel reformer efficiency may increase as the engine exhaust temperature increases. Higher exhaust temperatures may improve gasification of liquid fuels and may further increase the reformer catalyst efficiency.

Referring now to FIG. 5, is a simulated example plot of signals of interest when operating an engine by the methods of FIGS. 2 and 3. The first plot from the top of the figure represents a desired engine torque 514. The Y-axis arrow indicates a direction of increasing torque. Desired engine torque may be determined from a pedal position sensor or from a combination of inputs. For example, desired engine torque may be a function of a pedal position and a hybrid controller torque request.

The second plot from the top of the figure represents EGR amount 516 or another cylinder charge dilution constituent. The Y-axis arrow indicates a direction of increasing EGR. The EGR amount 516 may be internally sourced by adjusting valve timing or externally sourced by routing exhaust gases to the intake manifold. In an alternative example, the charge dilution may be formed using water.

The third plot from the top of the figure represents flow rate of reformate to the engine. The Y-axis arrow indicates a direction of an increasing reformate flow rate to the engine. Dotted line 518 represents the desired reformate flow rate to the engine at the present operating conditions. Solid line 520 represents the requested or commanded reformate flow rate to the engine.

The fourth plot from the top of the figure represents the available reformate amount 526 in the fuel system. The Y-axis arrow indicates a direction of an increasing amount of available reformate. The available reformate amount 526 in the fuel system may be determined from the temperature and pressure of the reformate storage tank and from sensing the oxygen concentration in the exhaust gases as discussed above.

The fifth plot from the top of the figure represents a cylinder charge actuator command 528. The cylinder charge actuator may be an intake throttle, turbocharger waste gate actuator, a cam timing actuator, valve lift actuator, or other devices that may adjust cylinder air charge. The Y-axis arrow indicates a direction of actuator movement that increases cylinder air charge. The X-axis of each of the four plots represents time and increases from the left to the right.

At time zero, indicated by the Y-axis of each plot, desired engine torque is low and increases slightly by the time of vertical marker 500. Further, from time zero to vertical marker 500, engine EGR amount 516, cylinder charge actuator command 528, and available reformate amount 526 are also at low levels. The desired reformate flow rate 518 is initially higher than the commanded reformate flow rate 520 while the available amount of reformate is below a first threshold indicated by horizontal line 524. The first threshold level 524 may vary depending on operating conditions. For example, the first threshold level 524 may be decreased when engine temperature is warm (e.g. engine temperatures greater than 50° C.) during a start so that reformate may be available during idle after engine start. The first threshold level 524 may be lowered during while the engine is warm because it may be expected that the fuel reformer will have capacity to reform fuel shortly after engine start. The first threshold level 524 may be raised during an engine cold start so that reformate may be conserved for engine starting rather idle. The first threshold level 524 may be raised during cold engine conditions (e.g. engine temperatures less than 20° C.) because it may be expected that it will take a longer time period before reformate is produced by the fuel reformer. Therefore, it may be desirable to conserve the available reformate for higher priority maneuvers.

In this example, the amount of available reformate amount 526 begins low and starts to increase before the time indicated by vertical marker 500. The rate of reformate production may increase with increasing engine exhaust temperature or by activating an electric heating element within the fuel reformer. In addition, pressure within the reformate storage tank may be adjusted by activating and deactivating a pump located between the fuel reformer and the reformate storage tank. In one example, the pump may be activated when pressure in the fuel reformer exceeds a threshold pressure.

From time zero to vertical marker 500, the cylinder charge actuator command 528 is at a position which adds little or no additional air to the base cylinder air charge amount. In one example, valve timing may be set during the illustrated conditions such that intake valve opening timing is set to a duration that is a shorter crankshaft angle duration than when a substantial amount of reformate is available. In another example, boost pressure from a turbocharger or supercharger may be reduced by opening a waste gate or positioning a vane control.

During the time period between vertical marker 500 and 502, desired torque 514 continues to increase, including one step like increase. EGR amount 516 or cylinder charge dilution also increases as the engine is in a part throttle condition. Desired reformate flow rate 514 also increases during this time so that engine combustion remains stable as cylinder charge dilution increases. In addition, the available reformate amount 526 also continues to increase. In one example, the available reformate amount 526 increases as the fuel reformer temperature increases. Further, the cylinder charge actuator command 528 is adjusted to increase the cylinder air charge capacity. In one example, the cylinder air charge capacity may be increased as a function of available reformate amount 526. In particular, the cylinder air charge capacity may be increased as the available reformate amount 526 increases. By increasing the cylinder air charge capacity, additional air and/or EGR may be inducted into engine cylinders. In this way, the cylinder charge capacity may be increased as the available reformate amount increases so that the engine may be operated at higher loads. It should also be noted that during some conditions, the cylinder dilution may be increased without increasing the cylinder charge capacity so that the engine may be operated less throttled. During such conditions, reformate may be supplied to the engine such that the reformate improves combustion stability as compared to when no reformate is supplied to the engine at similar dilution levels.

During the time period between vertical marker 502 and 504, desired torque 514 continues to increase, including another step like increase. Further, the available reformate amount 526 increases above a second threshold indicated by horizontal marker 522. When available reformate amount 526 is above the second threshold, the commanded reformate flow rate 520 may be increased above the desired reformate flow rate 518. During this time, the requested reformate flow rate to the engine 520 may be increased above the desired reformate flow rate 518 so that the amount of liquid fuel inject to the engine may be decreased and a substantially stoichiometric air-fuel mixture combusted. In addition, when fuel reformer output is high, additional flow from the reformate storage tank to the engine may be useful to purge gaseous fuel from the reformate storage tank that includes alcohol rather that reformate. For example, if the fuel reformer is producing reformate at a high rate and the amount of stored reformate is greater than a predetermined amount, the rate at which gaseous fuel flows to the engine may be increased beyond the desired rate so that the contents of the reformate storage tank are evacuated at a higher rate. In this way, reformate may be substituted for vaporized alcohol in the reformate storage tank. It should be noted that the second available reformate threshold 522 may be adjusted depending on operating conditions. For example, the second available reformate threshold amount 522 may be reduced when the rate at which reformate is produced exceeds a threshold.

During the time period between vertical marker 504 and 506, desired torque 514 is at the highest level in the plot. The amount of EGR amount 516 or charge dilution is reduced during this period so that the additional engine torque may be produced by the engine. In addition, the desired reformate flow rate 518 is increased so as to reduce the possibility of engine knock at higher cylinder loads. And, since the amount of available reformate is greater than the first threshold 524, and less than the second threshold 522, the commanded reformate flow rate 520 may be adjusted to match the desired reformate flow rate 518. If the gaseous fuel injected to the engine is comprised of a portion of alcohol, the flow rate of gaseous fuel from the reformate storage tank to the engine may be increased to compensate for the reduction in reformate. The cylinder charge actuator command 528 is also adjusted to increase the cylinder charge capacity. However, if reformate was not available or if less reformate was available, then the cylinder charge actuator command 528 would be adjusted to a position that allows a reduced cylinder charge. Thus, the cylinder charge actuator command 528 may be adjusted in response to the available reformate amount 526. For example, as the available reformate amount 526 increases, the cylinder charge actuator command 528 may be adjusted to increase the cylinder charge capacity.

During the time period between vertical marker 506 and 508, desired torque 514 is reduced. In addition, the available reformate amount 526 falls to a level less than the first threshold indicated by 524. Further, the requested reformate flow rate 520 from the reformate storage tank to the engine is reduced in response to the available reformate amount 526 being below the first threshold level. In concert with the reduced reformate flow rate, the cylinder charge actuator command 528 is adjusted to reduce the cylinder charge capacity. During some conditions it may be possible to reduce the level of available reformate stored in the reformate storage tank even when the fuel reformer is operating at full capacity because the engine may consume reformate at a rate higher than the fuel reformer produces reformate.

During the time period between vertical marker 508 and 510, desired engine torque 514 trends lower, but available reformate amount 526 increases above the first threshold 524. As a result, the requested reformate flow rate to the engine 520 is increased as is the cylinder charge capacity, which is increased by adjusting the cylinder charge actuator command 528. When the engine torque demand 514 goes from high load conditions to engine idle conditions, less reformate may be used to operate the engine. As such, the available reformate amount 526 stored in the reformate storage tank may be increased.

During the time period between vertical marker 510 and 512, desired engine torque 514 increases and the available reformate amount 526 is once again greater than the second threshold 524. Therefore, the requested reformate flow rate to the engine 520 may be increased to a level greater than the desired reformate flow rate to the engine 518. In addition, the cylinder charge actuator command 528 may be adjusted to increase the cylinder charge capacity.

Figure 6:
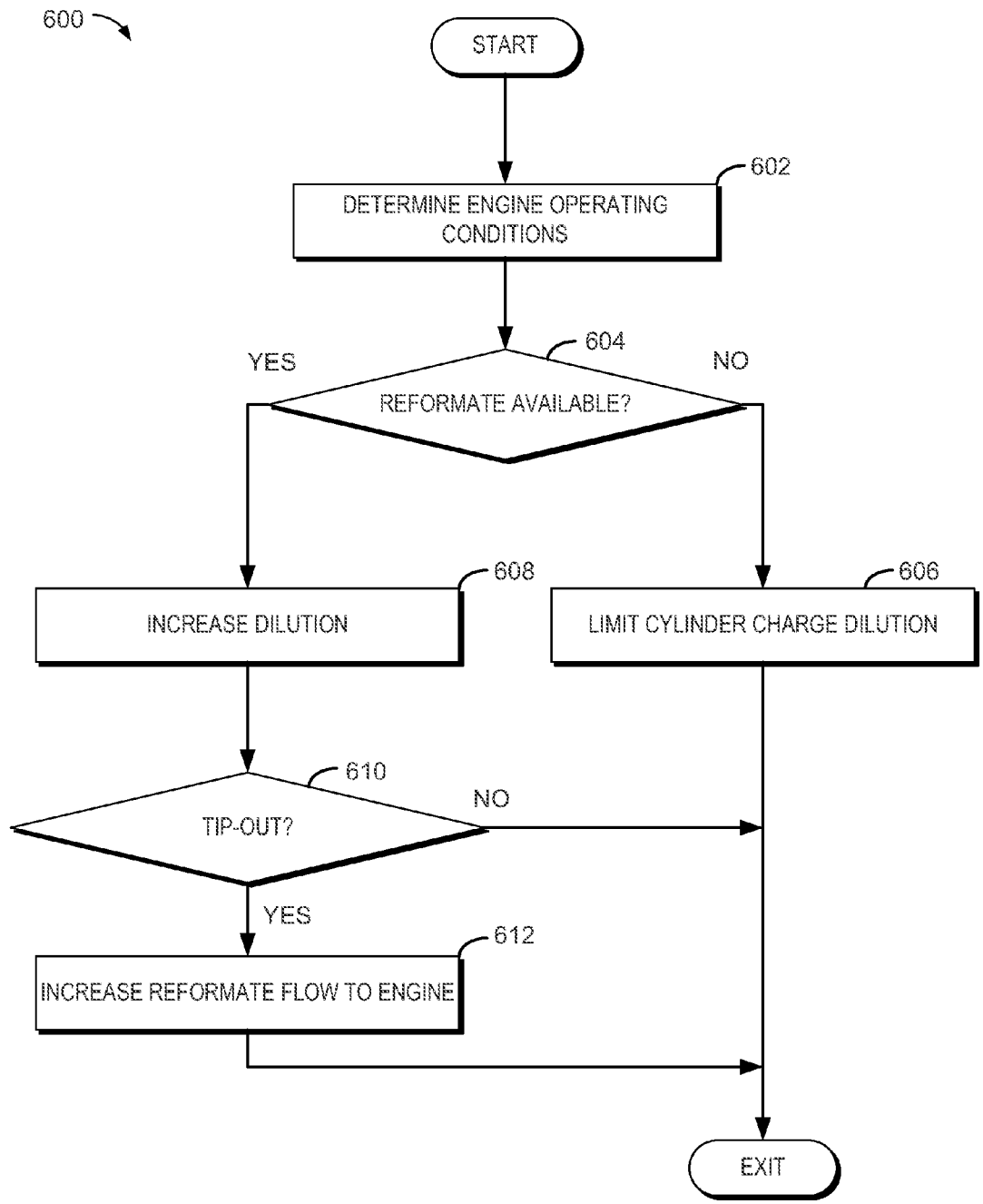
FIG. 6 is a flow chart for transient engine control with reformate.

Referring now to FIG. 6, a flow chart of a method for controlling an engine during transient conditions is shown. At 602, engine operating conditions are determined Engine operating conditions may include engine temperature, engine intake manifold pressure, engine speed, engine throttle position, transmission gear, as well as other engine operating conditions.

At 604, routine 600 judges whether or not reformate is available. In one embodiment, reformate may be judged as available when a pressure in a reformate storage tank is greater than a threshold pressure. In other embodiments, reformate may be judged available when pressure in the reformate storage tank is greater than a threshold and when the fuel reformer outputs reformate at a rate greater than a threshold rate. In still another embodiment, reformate may be judged available when a pressure in the reformate storage tank is greater than a threshold, when the fuel reformer outputs reformate at a rate greater than a threshold, and when an amount of liquid fuel stored in a storage tank is greater than a predetermined amount. If it is judged that reformate is available routine 600 proceeds to 608. Otherwise, routine 600 proceeds to 606.

At 606, routine 600 limits the amount of cylinder charge dilution. By limiting cylinder charge dilution, combustion stability may improved during driver tips-outs (e.g., releases an accelerator pedal) because less EGR is in the intake manifold and because the cylinder air amount is a higher portion of the cylinder mixture. If reformate is not available to inject to the engine is response to a change in accelerator pedal position or desired engine torque, the steady state level of cylinder charge dilution may be limited to a level that is less than if reformate is available to inject to engine cylinders during a tip-out. In one example, cylinder charge dilution is limited to a level that does not result in cylinder misfire in the event of a tip-out or reduction of desired engine torque. Thus, the cylinder charge dilution level is set to a level that is less than an amount that results in higher engine efficiency and stable combustion. For example, if an engine cylinder is capable of operating at a level of 30% EGR charge dilution and 24% thermal efficiency, the engine may be limited to a level of 24% EGR charge dilution and 23% thermal efficiency. By limiting the steady state level of cylinder charge dilution, the engine may be capable of withstanding transient changes in engine torque demand without misfiring. After cylinder charge dilution is limited to a predetermined level, routine 600 exits.

At 608, the steady state cylinder charge dilution is increased as compared to when the engine is operated without injecting reformate into the engine. The level of dilution may be increased in response to the amount of available reformate. In particular, level of dilution is increased in response to the rate of reformate production by the fuel reformer and the amount of reformate stored in the reformate storage tank. If the production rate of reformate is greater than a threshold amount and the amount of reformate stored in the reformate storage tank is greater than a threshold amount, the level of dilution in engine cylinders may be increased to a level that corresponds to a dilution level when a desired amount of reformate is available. If the rate of reformate production by the fuel reformer is less than a predetermined amount or if the amount of reformate stored in the reformate storage tank is less than a predetermined amount, then the level of dilution may be an amount greater than when the engine is operated without reformate but less than an amount when the engine is operated with the desired amount of reformate. In one embodiment, the level of dilution may be adjusted based on the level of reformate stored in the reformate storage tank. Thus, if the fuel reformer is reforming fuel at a rate greater than the engine is using reformate, the amount of reformate stored in the reformate storage tank may increase to a level where the amount of reformate used by the engine is the desired amount of reformate. However, if the fuel reformer is reforming fuel at a rate that is less than the engine is using reformate, engine dilution may be decreased until the engine is operating at a level of dilution appropriate for operating the engine without reformate.

At 610, routine 600 judges whether or not there is a tip-out by the driver or a reduction of the torque demand. For example, if the driver is operating the engine in a region where cylinder charge is diluted by depressing the accelerator to a mid-position, routine 600 may judge that there is a tip-out when the driver releases the accelerator pedal or reduces the distance that the accelerator is depressed. In alternate embodiments, a tip-out condition may be judged when a torque request to the engine is decreased. For example, if the vehicle is a hybrid vehicle, a tip-out condition may be indicated when a hybrid controller reduces engine torque demand when a battery becomes fully charged. Thus, a tip-out may be judged under different operating conditions and by different methods. If routine 600 judges that a tip-out is present, routine 600 proceeds to 612. Otherwise, routine 600 proceeds to exit.

At 612, routine 600 increases the amount of reformate injected to the engine. The injection of additional reformate may be initiated in response to a change in the position of an accelerator pedal or torque demand. In addition, the duration of adding additional reformate to the engine as well as the increase in the amount of reformate injected to the engine may be a function of engine cylinder dilution level, engine speed, and engine load prior to the change in accelerator position or engine torque demand. In one example, the level of increase in reformate may be empirically determined by operating the engine on a dynamometer and determining a level of increase in reformate that provides for stable combustion and eliminates or reduces the possibility of cylinder misfire. Further, duration and amount of reformate injected to engine cylinders may be related to the number of cylinder events that it takes to reduce the level of EGR in the intake manifold. For example, if the engine is operated at 3500 RPM and 0.45 load and there is a tip-out condition that reduces engine load to 0.2, the duration and amount of reformate injected to the engine may be related to the number of cylinder events that it takes to reduce the intake manifold of EGR to the new level of EGR defined by the new or present engine speed and load. Thus, since the number of cylinder events at 3500 RPM for a given amount of time is greater than the number of cylinder events at 2500 RPM, the duration of the increase of injected reformate may be shorter at 3500 RPM than when the engine is operated at 2500. However, the rate of injecting gaseous fuel to the engine may be increased at 3500 RPM as compared to when the engine is operated at 2500 RPM and a tip-out occurs. After EGR in the intake manifold is reduced, the amount of reformate injected to the engine may also be reduced. Thus, upon a tip-out or reduction in engine torque, reformate may be increased and then decreased as the engine reaches stabilized operating conditions.

Engine spark advance may also be adjusted in response to the tip-out and the location where reformate is injected to the engine. If reformate is injected directly to engine cylinders, spark may be held constant, advanced, or retarded at a level less than if reformate is injected to the intake manifold upstream of engine cylinders. If reformate is injected upstream in the intake manifold upstream of engine cylinders, spark may be initially retarded and then advanced as reformate reaches engine cylinders. As the engine reaches stabilized operating conditions, spark may be advanced or retarded to a level determined by the stabilized operating conditions. After the amount of reformate injected to the engine is increased routine 600 exits.

Figure 7:
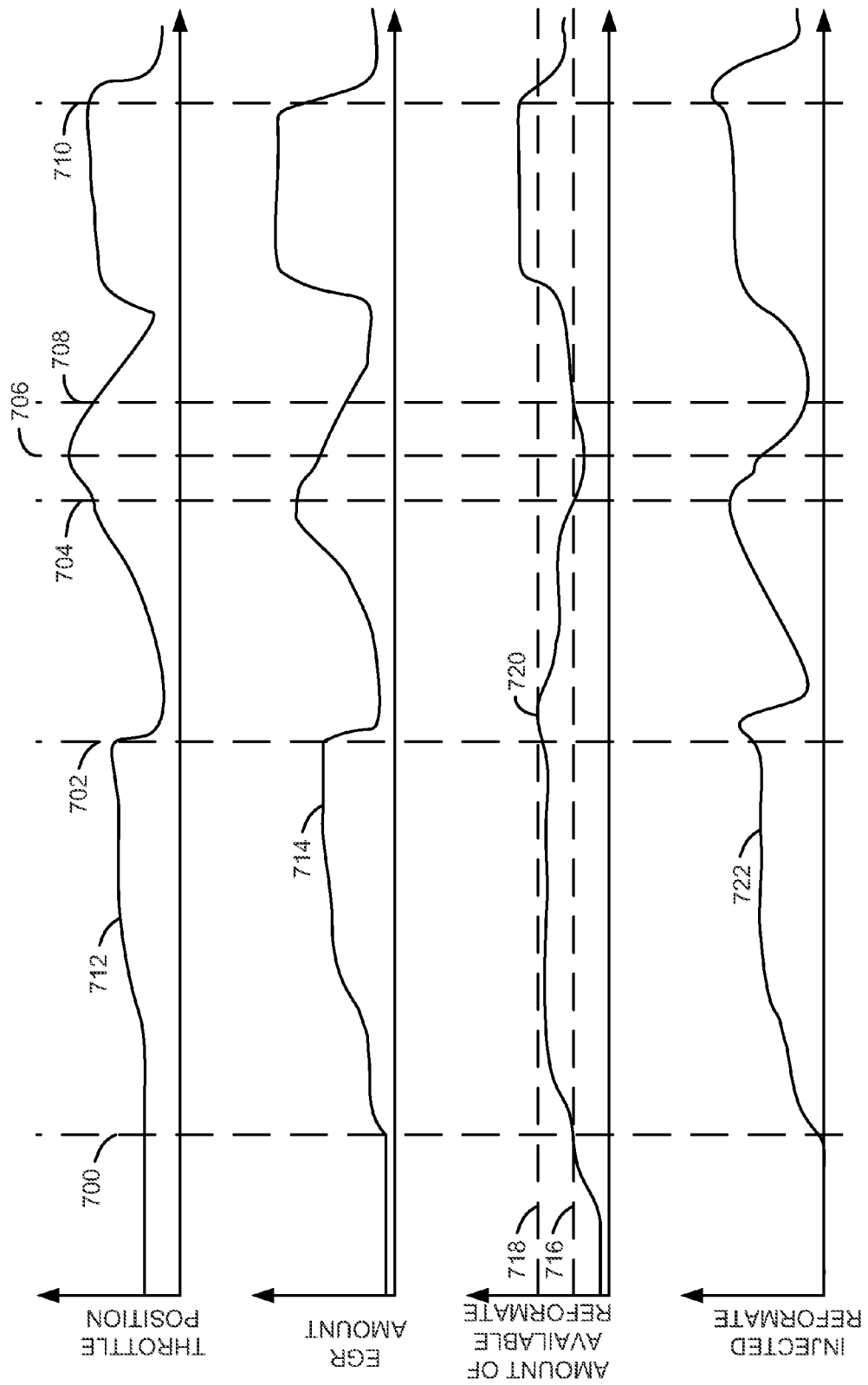
FIG. 7 is a simulated example plot of signals of interest of an engine operating with reformate by the method of FIG. 6.

Referring now to FIG. 7, simulated example plot of signals of interest of an engine operating with reformate is shown. The first plot from the top of the figure shows throttle position 708. The throttle opening increases in the direction of the Y-axis arrow.

The second plot from the top of the figure represents EGR amount 710 or another cylinder charge dilution constituent. The Y-axis arrow indicates a direction of increasing EGR. The EGR may be internally sourced by adjusting valve timing or externally sourced by routing exhaust gases to the intake manifold. In an alternative example, the charge dilution may be formed using water.

The fourth plot from the top of the figure represents the available reformate amount 716 in the fuel system. The Y-axis arrow indicates a direction of an increasing amount of available reformate. The available reformate amount 716 in the fuel system may be determined from the temperature and pressure of the reformate storage tank and from sensing the oxygen concentration in the exhaust gases as discussed above.

The fourth plot from the top of the figure represents the reformate flow rate 718 to the engine. The Y-axis arrow indicates a direction of an increasing rate of reformate flow to the engine. The X-axis for each plot represents time and increases from the left to the right.

At time zero, indicated by the Y-axis of each plot, engine throttle position is low and increases slightly by the time of vertical marker 700. In addition, from time zero to vertical marker 700, the amount of available reformate 720 increases from a low amount to a level equivalent to a first threshold level indicated by horizontal marker 716. Engine EGR amount 714 is also low during this time interval because the amount of available reformate is low.

During the time between vertical markers 700 and 702, throttle position 712 changes little but the available reformate amount 720 increases above the first threshold indicated by line 716. When the available reformate amount 720 exceeds the first threshold level 716, injection of reformate 722 to the engine begins. Further, engine EGR amount 714 is increased as reformate becomes available to the engine. Thus, by increasing reformate flow to the engine, the engine may tolerate higher levels of charge dilution while maintaining a desired level of combustion stability.

At vertical marker 702, the throttle position 712 is changed in a step-like manner. During such a throttle position change, it is possible that the engine will begin to knock in response to increased cylinder temperatures and pressures. By further increasing the reformate amount injected to the engine, it may be possible to reduce the possibility of engine knock during a throttle tip-in (e.g., a command for increased throttle opening or a greater torque request by way of a pedal or other device). In one example, additional reformate may be injected to the engine when the rate of change in throttle position exceeds a threshold. Further, the increase in injected reformate 722 to the engine may be based on the present engine speed and load as well as the rate of change in the throttle position 712. In particular, a control gain or multiplier that adjusts injected reformate 722 may be changed in relation to the change in throttle position 712 and engine operating conditions prior to the throttle tip-in. After the initial higher rate of change in throttle position 712, the rate of throttle change decreases. Accordingly, the increase in injected reformate to the engine 722 due to changing throttle position 712 is decreased and is gradually reduced to zero. Note that the rate of change of a pedal sensor or other sensor may be substituted for the rate of change of the throttle position 712.

After the initial change in throttle position 712, the throttle position 712 changes little but remains at a part throttle condition. Since the engine is operating at a part throttle condition, and since the amount of stored reformate is greater than first threshold 716, the EGR amount 714 diluting cylinder charge is increased. By increasing cylinder charge dilution, the engine may operate more efficiently because engine pumping losses may be reduced. Thus, the reformate amount injected to the engine 722 is adjusted in response to the change in throttle position 712. At the same time, the amount of reformate injected to the engine 722 is adjusted in response to engine speed and load. In this way, the flow of reformate may be adjusted to account for a change in throttle position 712 as well as a change in engine speed and load.

Similar changes in throttle position 712 occur at vertical markers 706 and 710. However, the amount of available reformate is reduced to less than the threshold level 716 from 704 until 708. The reformate amount injected to the engine 722 is also increased at 710, but the reformate amount injected at 706 is not increased as throttle position decreases while the amount of available reformate 720 is less than threshold 716. At 710, the amount of injected reformate 722 is increased as throttle position 712 is closed. In one example, it is possible to reduce or eliminate the reformate amount injected to the engine when the available amount of reformate is less than the first threshold indicated by 716.

Figure 8:
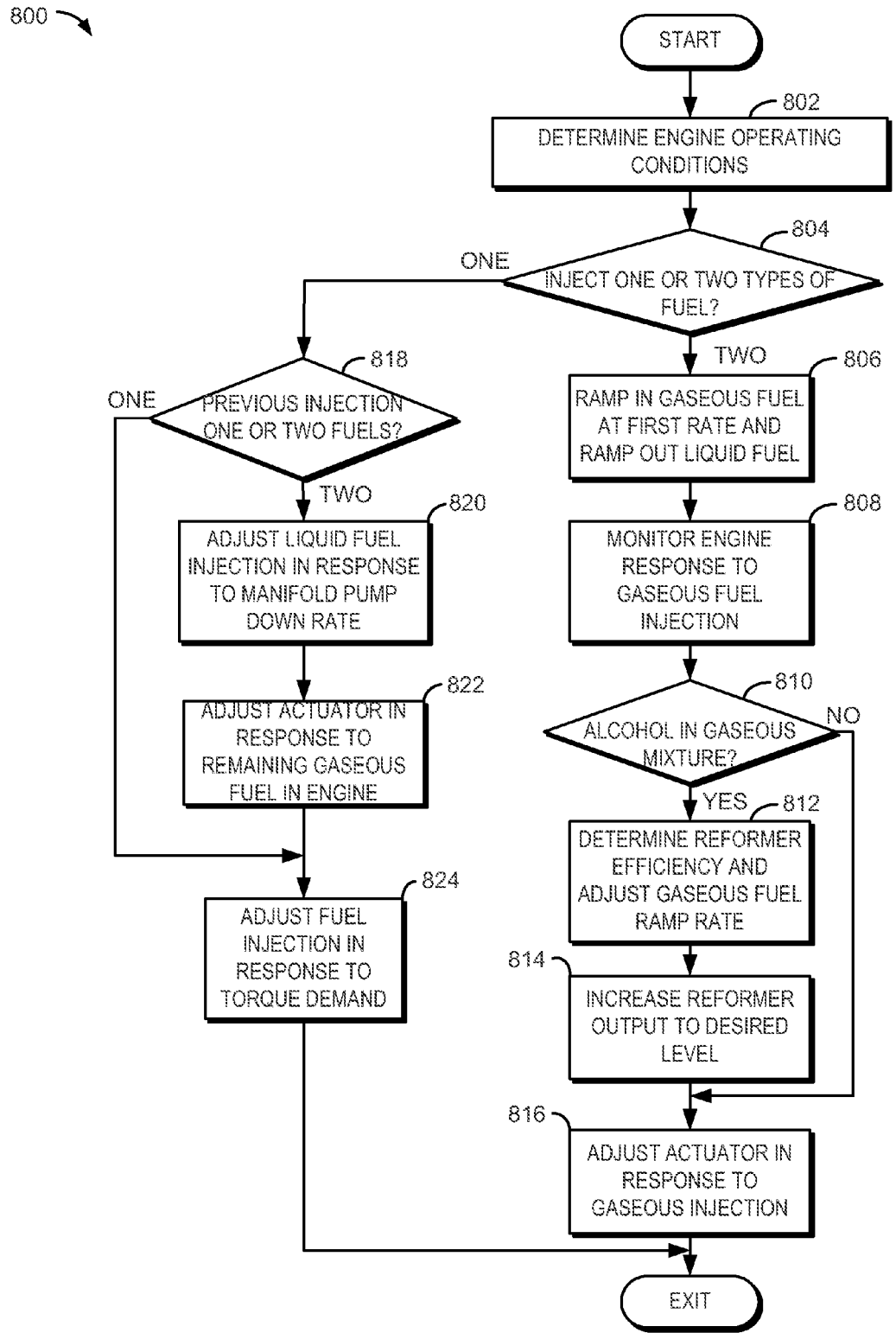
FIG. 8 is a flow chart for engine air-fuel control with reformate.

Referring now to FIG. 8, a routine for controlling an engine air-fuel ratio mixture is shown. At 802, engine operating conditions are determined. Engine operating conditions may include but are not limited to engine temperature, engine speed, engine load, engine operating time since engine stop. After engine operating conditions are determined routine 800 proceeds to 804.

At 804, routine 800 judges whether one fuel is to be injected to the engine or two fuels. One fuel may be injected to the engine during predetermined operating conditions. In one example, a single fuel may be injected to the engine when engine speed and load are low. For example, when engine speed is at idle speed and when engine load is less than 10% of full engine load. Two fuels may be injected to the engine at partial engine loads and during higher engine loads when the propensity of engine knock may be increased. In one example where the size of the fuel reformer is reduced for packaging the reformer in a vehicle, reformat may be stored at predetermined operating conditions while being consumed by the engine at other engine operating conditions. However, for embodiments where reformate is always available, the engine may operate using reformate all the time as reformate has a higher energy content as compared to alcohol. If routine 800 judges to inject one fuel, routine 800 proceeds to 810. Otherwise, routine 800 proceeds to 806.

At 806, routine 800 ramps injection of gaseous fuel to the engine. Since there may be uncertainty as to the gaseous fuel composition, the gaseous fuel injection begins at a low rate defined by the minimum injector pulsewidth. For example, the shortest electrical pulse at which the injector provides a consistent rate of fuel delivery. The introduction of gaseous fuel is increased at a low ramp rate until the composition of the gaseous fuel is determined In one example, a single sensor that senses $H_2$, CO, or $CH_4$ may be disposed in the gaseous fuel line to the engine or in the gaseous storage tank. Since the reformer produces $H_2$, CO, and $CH_4$ in known even molar quantities a single sensor sensing any one gas constituent may be used to determine the overall concentration of reformate in the gaseous fuel system. For example, the amount of reformate in the fuel system may be determined by sensing the concentration of $H_2$ in the gaseous fuel system.

After the composition of fuel is determined, gaseous fuel injection may be ramp at a second rate or gaseous fuel injection may be increased in a stepwise manner to the desired gaseous flow rate. In one embodiment the engine controller may store data representing the composition of the gaseous fuel when the gaseous fuel is injected to the engine. The data may then be used to set the gaseous fuel flow rate to the desired flow rate such that ramping of fuel may be shorter in duration or eliminated. In such an embodiment, the fuel composition may only be used when the fuel reformer stops adding gaseous fuel to the reformate storage tank before the time gaseous fuel was last injected to the engine.

At the time injection of gaseous fuel begins, the injected amount of liquid fuel is reduced so that the engine may continue to operate at a desired air-fuel ratio, a stoichiometric air-fuel ratio for example. In one example, where the engine is operated with alcohol as a substantial component of the liquid fuel (e.g., greater than 40% alcohol), it may be desirable to operate the engine substantially with reformate (e.g., greater than 50% of the cylinder fuel charge fraction) and reduce the use of liquid fuel since reformate has a higher heating value. If the gaseous fuel is comprised substantially of reformate, the amount of liquid fuel injected to the engine may be reduced by a mass equal to the mass of gaseous fuel injected Likewise, if the gaseous fuel is comprised substantially of alcohol, the amount of liquid fuel injected to the engine may be reduced by a mass equal to the mass of gaseous fuel injected to the engine; however, if the composition of the gaseous fuel is improperly assumed, the volume of fuel injected by the gaseous fuel injector may cause the air-fuel ratio of engine cylinders to change in a rich or lean direction. Accordingly, the amount of liquid fuel injected to the engine may be reduced at a ramp rate that is a fraction of the ramp rate gaseous fuel is introduced to the engine. Note that the engine needs the same mass of reformate as it needs alcohol, whether liquid or vapor, to a given cylinder air charge. Therefore, it may be desirable to express the fueling in mass of injected fuel rather than by volume of gas injected. The mass of fuel injected may be determined by inferring or detecting the gaseous fuel composition.

At 808, routine 800 monitors the exhaust gas oxygen concentration to estimate the engine air-fuel ratio. By monitoring the exhaust gas oxygen concentration it is possible to determine the composition of the gaseous fuel. In one example as described above, an adaptive fuel parameter may be used to estimate the composition of reformate in the gaseous fuel mixture. As a result, the amount of gaseous fuel may be increased or decreased as the exhaust gas oxygen deviates from a desired amount. For example, gaseous fuel may be injected assuming that the gaseous fuel composition is 100% reformate. By their physics, the gaseous injectors inject volume (i.e. moles). If the gaseous fuel is 100% reformate, the exhaust gas oxygen sensor indicates an oxygen concentration indicative of a substantially stoichiometric air-fuel mixture. However, if the gaseous fuel is 0% reformate, the gaseous fuel injector will deliver three times the fuel required for stoichiometric combustion. Therefore, the injection of gaseous fuel is limited until it can be ascertained that the fuel reformer is outputting reformate at a desired rate. If the gaseous injector are operated to inject 10% of the cylinder fuel charge in the form of reformate, but 100% vaporized alcohol is injected instead, then the fuel delivered will be 120% of the desired fuel and this error state will be indicated by the exhaust gas composition sensor(s). In this way, the gaseous fuel composition can readily be inferred. Once the fuel composition is inferred, then fuel injection can continue using this new composition or gaseous fuel injection may be deactivated until the fuel reformer is outputting reformate at the desired rate.

At 810, routine 800 judges whether or not the gaseous fuel mixture is comprised of vaporized alcohol. In one example, routine 800 judges whether or not alcohol is present in the gaseous fuel in response to the amount or volume of gaseous fuel injected and the engine air-fuel ratio indicted from the exhaust gas oxygen concentration. For example, if it is judged that the engine is operating with an air-fuel mixture that is richer than anticipated if the engine were operating with gaseous fuel comprised solely of reformate, it may be judged that alcohol is present it the gaseous fuel mixture. If it is judged that alcohol is present routine 800 proceeds to 812. Otherwise, routine 800 proceeds to 816.

At 812, routine 800 determines the fuel reformer efficiency and adjusts the gaseous fuel flow rate. When it is determined from the exhaust gas oxygen sensor and the gaseous fuel flow rate that the composition of gaseous fuel has changed, the amount of gaseous fuel injected to the engine may be adjusted to compensate for the change in fuel composition. For example, if the fuel reformer efficiency decreases and the exhaust gas oxygen concentration is richer than expected, the amount of injected gaseous fuel may be decreased. Further, since alcohol does not have the same effect on charge dilution as reformate, the amount of gaseous fuel injected during transient conditions or during periods when cylinder charge is diluted may be increased to compensate for a lower fraction of reformate in the gaseous fuel mixture. For example, if a gaseous fuel injected to the engine is comprised of 80% reformate, the flow rate or injection duration of the gaseous fuel may be raised by 0.8 divided by the desired flow rate of gaseous fuel. In this way, the desired amount of reformate may be delivered to the engine even when the gases stored in the reformate tank are not comprised solely of reformate.

Fuel reformer efficiency may also be determined at 812 from an adaptive parameter that indicates the engine would be operating at a leaner or richer mixture if fuel compensation were not provided. When injecting an amount of gaseous fuel results in an adaptive fuel multiplier of 0.33, it may be determined that the gaseous fuel is comprised of substantially all alcohol as the volumetric stoichiometric air-fuel ratio for alcohol is 0.33 of that of reformate. When injecting an amount of gaseous fuel results in an adaptive fuel multiplier of 1, it may be determined that the gaseous fuel is comprised of substantially all reformate. Accordingly, the fuel reformer efficiency may be determined after inserting the adaptive fuel multiplier into an equation of a straight line that describes 0.33 as 0% efficiency and 1 as 100% efficiency.

At 814, routine 800 may adjust fuel reformer output. If the fuel reformer is operating at an efficiency that is less than desired, fuel reformer output may be increased by retarding engine spark advance and increasing the mass flow rate through the engine. For example, fuel reformer output may be increased by retarding spark and opening the engine throttle, thereby increasing exhaust heat. Further, routine 800 may decrease spark retard when fuel reformer efficiency is low and after driver demand torque indicates that engine temperature is likely to increase in response to the driver demand torque.

In another example, an electric heater may be activated to increase the efficiency of fuel reformer output. For example, it may be desirable to electrically heat the fuel reformer when engine temperature is low after a cold engine start. Further, it may be desirable to activate the electric heater during engine deceleration or when the vehicle is descending a hill. Thus, the electric heater may be activated when current is available from the vehicle electrical system (e.g., alternator) when little exhaust energy is available. Further, during some conditions it may desirable to retard engine spark and increase engine mass flow while also activating the electric heater.

At 816, routine 800 adjusts actuators in response to the gaseous fuel injected to the engine. Actuator adjustment may include and are not limited to adjustment of spark timing circuitry, gaseous and liquid injection timing, and valve timing and valve lift adjustments. For example, if it is determined that a greater fraction of alcohol is injected than expected and less reformate is injected, engine cams may be indexed such that less EGR is present in engine cylinders. Further, if the exhaust gas oxygen concentration is less than expected the amount of gaseous fuel injected to the engine may be decreased. In another example, cylinder charge may be limited or decreased by adjusting a throttle, cam, and/or compressor boost pressure. After actuators are adjusted routine 800 proceeds to exit.

At 818, routine 800 judges whether the injection of fuel during the previous cylinder cycle of the cylinder scheduled to receive fuel was injection of a single fuel or of two fuels. If two fuels were injected during the last cylinder cycle of the cylinder scheduled to receive fuel, routine 800 proceeds to 820. Otherwise, routine 800 proceeds to 824.

At 820, routine 800 adjusts the amount of liquid fuel injected to engine cylinders in response to the intake manifold pump down rate. Intake manifold volume may be on the order of 1.5-2 times the engine displacement volume. Each time an intake valve opens a portion of the intake manifold gases may be evacuated into a cylinder. Therefore, after injection of gaseous fuel ceases to the engine, the intake manifold contents are diluted from the level of when gaseous fuel is injected to the engine. With each cylinder that evacuates a portion of intake manifold gases, gases in the intake manifold become increasingly diluted with air. Consequently, additional liquid fuel may be added to the engine at a rate that corresponds to the rate gaseous fuel is evacuated from the intake manifold. In one example, the liquid fuel is increased to the engine each time a cylinder inducts gases from the intake manifold until a number of cylinders that evacuate the volume of the intake manifold have inducted intake manifold gases. In an alternate embodiment, the amount of liquid fuel injected increases for each engine cylinder that inducts intake manifold gases until engine cylinders have evacuated the intake manifold. Note that these actions may be eliminated/simplified by selecting fuel injection configurations that have little or no intake stored fuel from cylinder event to cylinder event.

At 822, routine 800 adjusts actuators in response to the amount of gaseous fuel remaining in the intake manifold. Actuator adjustment may include and are not limited to adjustment of spark timing, gaseous and liquid injection timing, and valve timing and valve lift adjustments. For example, if it is determined that a greater fraction of alcohol is injected than expected and less reformate is injected, engine cams may be indexed such that less EGR is present in engine cylinders. In addition, actuators may be advanced or retarded at different rates depending on the fuel composition. For example, cams may be indexed at a faster rate if reformate is a higher fraction of the amount of gaseous fuel injected to the engine because the cam timing may be further advanced or retarded to provide additional internal EGR as compared to when vaporized alcohol is the primary constituent of the gaseous fuel. Further, if the exhaust gas oxygen concentration is less than expected, the amount of gaseous fuel injected to the engine may be decreased. In another example, cylinder charge may be limited or decreased by adjusting a throttle, cam, and/or compressor boost pressure. After actuators are adjusted routine 800 proceeds to exit.

At 824, engine fueling is adjusted in response to engine torque demand and engine speed. In particular, the amount of liquid fuel injected to the engine is adjusted in response to engine speed and engine load (or torque demand). In one example, an engine is operated with a substantially stochiometric air-fuel ratio. However, at engine speeds where $NO_x$ increases, the engine may be operated with a richer air-fuel mixture to reduce production of $NO_x$. Conversely, when less engine $NO_x$ is produced, the engine may be operated with a leaner air-fuel mixture to reduce HC emissions. Routine 800 exits after the amount of liquid fuel injected to the engine is set to provide a substantially stoichiometric air-fuel mixture.

Figure 9:
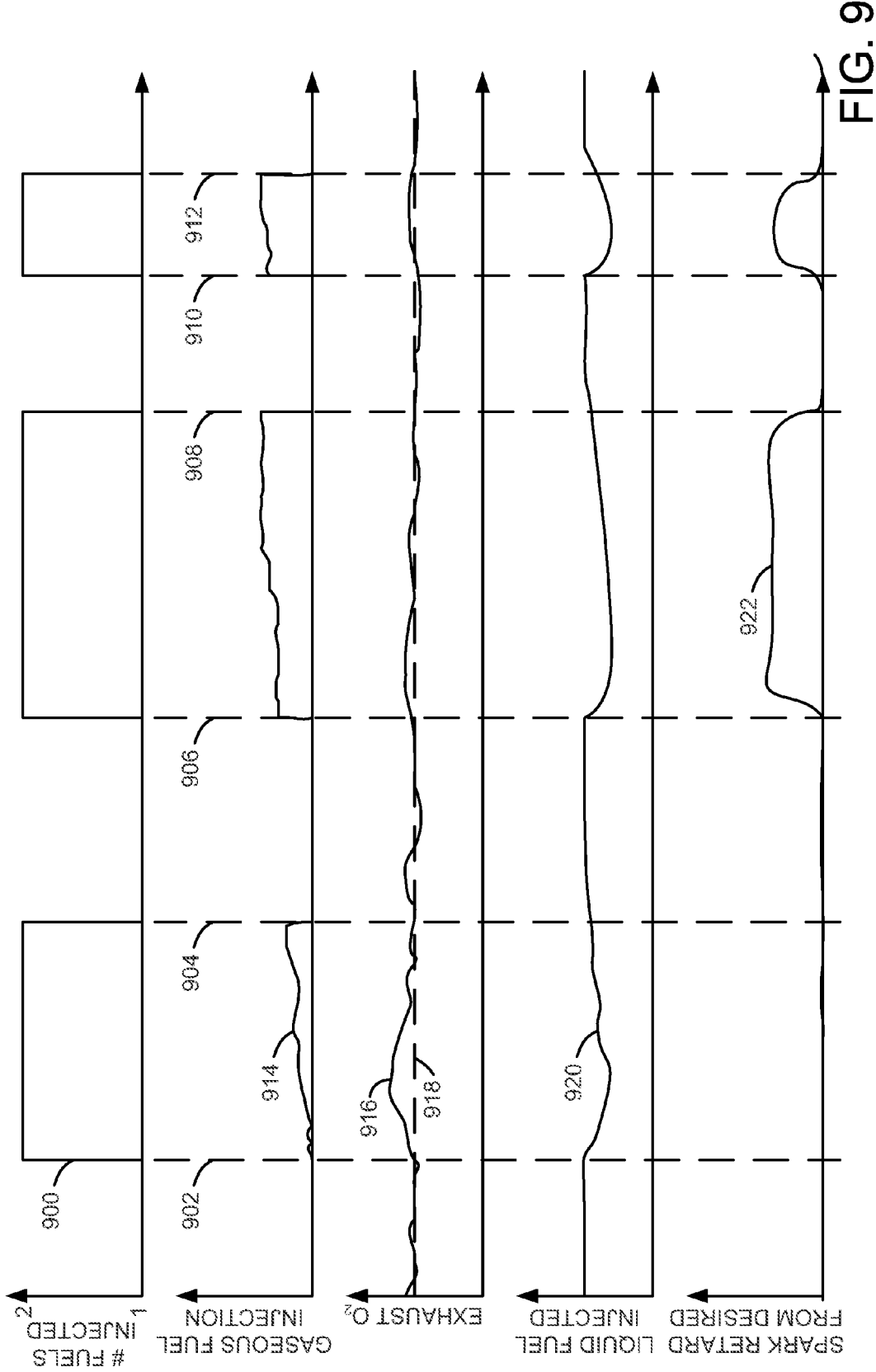
FIG. 9 is an example plot of air-fuel related signals of interest operating an engine with reformate by the method of FIG. 8.

Turning now to FIG. 9, a simulated plot of air-fuel related signals of interest operating an engine with reformate is shown. The first plot from the top of the figure represents the timing of injection of two fuels. In particular, when signal 900 is low (e.g. at the level of the X-axis), fuel injection is by way of a single fuel injector at each engine cylinder that receives injected liquid fuel. When signal 900 is high (e.g. at the level of 2 of the Y-axis), fuel injection is by way of two fuel injectors for each engine cylinder. In particular, gaseous fuel is injected by a gaseous fuel injector and liquid fuel is injected by a second injector.

The second plot from the top of the figure represents flow of gaseous fuel to the engine. Gaseous fuel may be comprised of reformate or of a combination of reformate and vaporized alcohol. If the gaseous fuel is comprised of substantially all reformate, a given volume of the gaseous fuel will produce an air-fuel mixture that is leaner than if the same volume of vaporized alcohol is introduced to the engine under similar conditions. As discussed above, reformate has a volume based stoichiometric air-fuel ratio that is three times greater than that of vaporized ethanol. Thus, it may be desirable to know the composition of fuel prior to injection. However, the composition of gaseous fuel may change unexpectedly at times. For example, if the efficiency of the fuel reformer increases or decreases, the composition of gaseous fuel stored in the reformate fuel tank may likewise change. Therefore, it may be desirable to ascertain the gaseous fuel composition before a large amount of gaseous fuel is injected to the engine.

The third plot from the top of the figure represents the oxygen concentration remaining in engine exhaust gases after combustion of air and fuel in engine cylinders. Horizontal line 914 represents an exhaust oxygen concentration for a stoichiometric air-fuel mixture after combustion. When exhaust gas oxygen trace 916 is above line 918, the engine air-fuel mixture is lean. When exhaust gas oxygen trace 916 is under line 918, the engine air-fuel mixture is rich.

The fourth plot form the top of the figure represents the amount of liquid fuel injected to the engine 920. The amount of liquid fuel injected to the engine 920 is related to the amount of air in the cylinder charge as well as the amount of gaseous fuel injected to the engine. Further, since the volume based stoichiometric air-fuel ratio of reformate is three times greater than that of vaporized ethanol, the amount of liquid fuel injected 920 may be adjusted in response to the composition of the gaseous fuel.

The fifth plot from the top of the figure represents spark retard from desired spark timing 922. For example, if gaseous fuel is injected to an engine and the desired gaseous fuel is reformate, the engine may be able to tolerate more spark advance than if the injected gaseous fuel is vaporized alcohol. Thus, if vaporized alcohol is injected to the engine rather than reformate, spark may be retarded because vaporized alcohol raises the octane of fuel injected to the cylinder less than reformate. Alternatively, a cylinder charge actuator (e.g., camshaft) may be adjusted as a function of the amount of reformate and/or alcohol detected in the gaseous fuel mixture.

At time zero, indicated by the Y-axis of each plot, a single fuel is injected to the engine (e.g., alcohol, gasoline, or a mixture of gasoline and alcohol) as indicated by trace 900 up to the time illustrated by vertical marker 902. During the time period between time zero and vertical marker 902, the engine exhaust exhibits an oxygen level that indicates substantially stoichiometric combustion.

At the time of vertical marker 902, gaseous fuel is injected to the engine. Simultaneously, the amount of liquid fuel injected to engine cylinders is reduced in expectation that the gaseous fuel will richen the cylinder air-fuel mixture. In one example, the gaseous fuel is initially estimated to be comprised of substantially all reformate. In another example, the gaseous fuel is initially estimated to be comprised of substantially all vaporized alcohol. In yet another example, a portion of the gaseous fuel is estimated to be comprised of reformate while the remaining portion of gaseous fuel is estimated as vaporized alcohol. Further, one or more memory locations in the engine controller may be used to make an initial estimate of the gaseous fuel composition. In particular, the memory locations are configured to contain an estimate of the fraction of reformate in the gaseous fuel. The estimate is based on the volume of gaseous fuel injected to the engine and exhaust gas oxygen concentration feedback from an oxygen sensor as described above. Further, the gaseous fuel composition is based on the injection of gaseous fuel during an engine operating interval during which gaseous fuel was injected to the engine, the operating interval before the present interval of gaseous injection and before an interval when liquid fuel was solely injected to fuel the engine.

As shown in the second plot from the top of FIG. 9, the amount of gaseous fuel injected to the engine is ramped in so that the exhaust gas oxygen concentration changes slowly rather than in a stepwise manner. By ramping in injection of gaseous fuel, the possibility of large excursions in exhaust gas concentration may be reduced. For example, as show in FIG. 9, the engine exhaust gas concentration starts to go lean (e.g., above stoichiometric indicator line 918) indicating that the injection of liquid fuel 920, based on the estimated gaseous fuel composition, has been reduced too much. Therefore, the engine controller recognizes the lean condition in response to the oxygen sensor output and then increases the amount of liquid fuel injected. Alternatively, the engine controller can increase the amount of gaseous fuel injected to the engine if desired.

At the time of vertical marker 904, the injection of gaseous fuel is ceased and the injection of liquid fuel increases to a level necessary for stoichiometric combustion. In one example, where gaseous fuel is injected to the intake manifold, it takes a number of cylinder intake events to evacuate the gaseous fuel from the intake manifold. Therefore, the amount of liquid fuel injected to the engine is increased at a rate related to the evacuation of gaseous fuel from the intake manifold as may be solved by a pump-tank differential equation.

At the time of vertical marker 906, gaseous fuel is again injected to engine cylinders at a desired rate based on engine operating conditions. For example, at a particular engine speed and load, a specific gaseous fuel flow rate may be injected to the engine. The amount of liquid fuel injected to the engine may be reduced based on the gaseous fuel flow rate and the gaseous fuel composition. For example, if the gaseous fuel is comprised of a higher concentration of reformate, the amount of liquid fuel injected to the engine may be reduced more/less than if the gaseous fuel is comprised of a higher concentration of vaporized alcohol. In addition, as indicated by the fifth plot from the top of the figure, cylinder spark may be retarded from an amount that would be desirable if gaseous fuel were comprised of substantially all reformate. In this way, spark advance may be controlled as a function of the concentration of reformate or alcohol in the gaseous fuel.

At the time between vertical marker 908 and vertical marker 910, a single liquid fuel is injected to the engine cylinders. Again, the amount of liquid fuel injected may increase at a rate related to evacuation of gaseous fuel from the intake manifold. In addition, spark is returned to a spark advance desired when only liquid fuel is injected to engine cylinders at the present engine operating conditions.

At the time between vertical marker 910 and 912, gaseous fuel is again injected to the engine and the amount of liquid fuel injected to engine cylinders is again reduced. The injection of liquid fuel may be reduced at a rate that is related to the rate of filling of the intake manifold with gaseous fuel. After vertical marker 912, injection of the gaseous fuel is stopped and the amount of liquid fuel injected to the engine is increased.

In an alternate example, the gaseous flow rate is set so that the desired amount of reformate is injected to the engine. For example, if the gaseous fuel is comprised of 80% reformate and 20% vaporized alcohol, the amount of gaseous fuel injected may be regulated to the desired reformate flow rate divided by 0.8. Thus, the overall gaseous flow rate is increased so that the desired amount of reformate is delivered to the engine. The amount of liquid fuel injected to the engine between marker 906 and marker 908 is reduced based on the composition of the gaseous fuel and the gaseous fuel flow rate. As a result, the engine exhaust gases exhibit an oxygen concentration that is indicative of a substantially stoichiometric air-fuel mixture.

Referring now to FIG. 10, flow chart for a reformate prioritization is shown. At 1002, routine 1000 determines engine operating conditions. Engine operating conditions may include but are not limited to engine speed; engine load (e.g., engine load may be expressed at the amount of air charge of engine cylinders divided by the theoretical maximum air charge that a cylinder may hold at a defined pressure); ambient temperature, pressure, and humidity; and engine torque request (e.g., desired engine torque). Routine 1000 proceeds to 1004 after engine operating conditions are determined At 1004, routine 1000 determines the available amount of reformate, the desired rate of reformate consumption, and first and second threshold amount of reformate at the present or current engine operating conditions. The available amount of reformate may be determined as described for 204 of FIG. 2. The desired amount of reformate may be determined as described for 208 of FIG. 2.

The first and second threshold amounts of reformate consumption may be described as an amount of reformate used to carry out a number of predefined engine operations at present engine operating conditions. For example, the first threshold amount of reformate may be an amount of reformate to accelerate the vehicle at base conditions (e.g., no grade, loaded with two passengers and no cargo) from the present speed to another predefined engine speed within a predetermined time period. The second threshold amount of reformate may be the first amount of reformate increased by a factor of three so as to increase an available number of maneuvers that can be performed with stored gaseous fuel.

In another example, the first threshold amount of reformate may be an amount of reformate used to operate the engine at a vehicle speed with a level of cylinder dilution that provides a predetermined rate of fuel consumption for a predetermined amount of time. The second threshold amount in this example may be the first threshold amount increased by a predetermined factor, four for example.

In still another example, the first threshold amount of reformate may be the amount of reformate that is produced by the fuel reformer over a defined time period (e.g., 10 minutes). In still another example, the first threshold amount of reformate consumption may be the amount of reformate that is produced by the fuel reformer over a predefined time period (e.g., two minutes) plus an additional amount of reformate. For example, if the reformate storage tank is capable of storing 100 $cm^3$ of gaseous fuel at a pressure of 10 bar. The first threshold amount of reformate may be 100 $cm^3$ of reformate at a pressure of 4 bar. In this example, the second threshold amount of reformate may be 100 $cm^3$ of reformate at a pressure of 8 bar.

In addition, the first and second threshold amounts of reformate may be adjusted. For example, the first and second threshold amounts may be adjusted for engine operating conditions, fuel reformer operating conditions, desired engine fuel consumption rate, and atmospheric conditions.

In another example, the first threshold amount of gaseous fuel stored in the reformate storage tank may be fixed at a constant value. In still another example, the first and second threshold amounts of gaseous fuel stored in the reformate storage tank may be a function of the amount of reformate in the stored gaseous fuel. For example, if the gaseous fuel is comprised of substantially reformate the first threshold amount of gaseous fuel may be set to a first amount. If the gaseous fuel is comprised of reformate and vaporized alcohol, the first threshold amount of gaseous fuel may be set to a second amount, the second amount greater than the first amount. The second threshold amount of reformate may be adjusted in a similar manner. In this way, the first and second threshold amounts of gaseous fuel may be adjusted so that the amount of reformate stored in the reformate tank is substantially the same even though the gaseous fuel includes vaporized alcohol. Routine 1000 proceeds to 1006 after determining the available amount of reformate, desired rate of reformate consumption, and the first and second threshold amounts of reformate.

At 1006, routine 1000 judges whether or not an amount of gaseous fuel stored in the reformate storage tank is less than the first threshold. If routine 1000 judges an amount of stored reformate is less than a first threshold, routine 1000 proceeds to 1014. Otherwise, routine 1000 proceeds to 1008.

At 1008, routine 1000 judges whether or not the amount of gaseous fuel stored in the reformate storage tank is greater than a second threshold. In one example, the second threshold amount of gaseous fuel stored in the reformate storage tank may be an amount greater than the first threshold by predetermined factor (e.g., 3 times the first threshold amount). In another example, the second threshold amount of gaseous fuel stored in the reformate storage tank may vary with operating conditions. For example, the second threshold amount of gaseous fuel stored in the reformate storage tank may be reduced to 65% of the storage tank capacity when the fuel reformer is producing gaseous fuel at a rate greater than a predetermined amount. In still another example, the second threshold amount of reformate or gaseous fuel stored in the reformate storage tank may be a related to the desired rate of reformate use. For example, if the desired rate of reformate use is a first amount, the second threshold amount of gaseous fuel stored in the reformate storage tank may be a first amount. If the desired rate of reformate is a second amount, greater than the first desired rate of reformate use, the second threshold amount of gaseous fuel stored in the reformate storage tank may be increased to a second amount, greater than the first amount when the desired rate of reformate use is a first amount.

If routine 1000 judges an amount of stored reformate is greater than the second threshold amount of reformate, routine 1000 proceeds to 1010. Otherwise, routine 1000 proceeds to 1018.

At 1010, routine 1000 increases the rate of gaseous fuel consumption above a desired rate of reformate consumption. In one example, when the gaseous fuel is comprised of reformate and vaporized alcohol, the amount of gaseous fuel injected to the engine is increased to the engine to a level such that the amount of reformate contained in the gaseous fuel injected to the engine is substantially equal to the desired rate of reformate use. In another example where the gaseous fuel is comprised of substantially all vaporized alcohol, the rate of injection of gaseous fuel may be increased above the desired rate of reformate use so that the vaporized alcohol can be evacuated from the reformate storage tank and replaced with reformate. Routine 1000 proceeds to 1012 after adjusting the reformate use.

At 1012, routine 1000 injection of liquid fuel is adjusted in response to increasing or decreasing injection of gaseous fuel. When the amount of gaseous fuel injected to an engine is changed, and the new amount of gaseous fuel comprises a lesser or greater portion of the cylinder air charge, the amount of injected liquid fuel may be adjusted to compensate for the change in gaseous fuel. In one example, the amount of liquid fuel reduction may be a function of the gaseous fuel composition and the volume of gaseous fuel injected. For example, if the gaseous fuel is comprised substantially of alcohol and injected at a first volumetric flow rate, the amount of liquid fuel injected to the engine may be reduced by a first amount. On the other hand, if the gaseous fuel is comprised substantially of reformate and injected at the first volumetric flow rate, the amount of liquid fuel injected to the engine may be reduced by a second amount, less than the first amount.

In another example when the amount of gaseous fuel injected is decreased, the amount of liquid fuel injected to the engine may be increased at a rate that corresponds to a rate at which the intake manifold is evacuated of gaseous fuel. Further, the amount of increase in liquid fuel injection amount may be related to the fuel type and concentration of fuel type in the gaseous fuel mixture. For example, if the gaseous fuel is comprised of solely reformate, the amount of liquid fuel may be increased by a first amount for each cylinder intake event at a particular engine operating condition. On the other hand, if the gaseous fuel is comprised of solely vaporized alcohol, the amount of liquid fuel may be increase by a second amount for each cylinder intake event during similar operating conditions.

At 1014, routine 1000 judges whether or not to increase the rate of reformate production. In one example, routine 100 requests additional reformate when the rate of reformate production is less than a threshold rate. The threshold rate may vary with operating conditions. For example, shortly after an engine cold start, the threshold rate of reformate production may be a first amount. After engine temperature increases the threshold rate of reformate production may be increased to a second amount. If routine 1000 judges it desirable to increase reformate production, routine 1000 proceeds to 1020. Otherwise, routine 1000 proceeds to 1016.

At 1020, routine 1000 adjusts engine operation to increase reformate generation. In one example, the rate of reformate production may be increased when engine exhaust temperature is greater than a threshold by increasing fuel flow to the fuel reformer. In this way, the amount of exhaust heat transferred to the fuel reformer may be increased to reduce engine exhaust temperature and to protect exhaust after treatment devices. In another example, engine spark retard may be increased to increase fuel reformer output so that additional reformate is available to the engine during engine conditions where exhaust gas temperatures may be low. For example, after an engine cold start or during an extended engine idle period (e.g., idle greater than 2 minutes), engine spark may be retarded and the intake throttle may be opened to increase exhaust gas temperature and the gas flow. The additional exhaust gas heat and mass flow may be used to increase the output of the fuel reformer.

During engine accelerations or during higher engine loads, spark may be adjusted from retarded conditions to minimum spark for best torque (MBT) or to knock limited spark to increase engine efficiency. Engine exhaust gas temperatures increase when an engine is operated at higher loads because the cylinder charge is increased which allows the cylinder temperatures and pressures to increase. Therefore, during such conditions, there may be sufficient exhaust gas energy to operate the fuel reformer at rated capacity without spark retard. Thus, spark retard may not be required or may be reduced during such conditions.

Fuel reformer output may also be increased by activating an electric heater within the fuel reformer when a temperature of the fuel reformer is less than a threshold temperature. In one example, an electric heater in a fuel reformer may be activated during a cold engine start to increase engine load so that exhaust gas temperatures increase at an accelerated rate. During a cold engine start, a substantial amount of exhaust gas energy is imparted to exhaust after treatment devices (e.g., catalysts) which may leave little heat to activate the fuel reformer. During such conditions, it may be desirable to activate an electric heater so that reformate may be produced before engine exhaust gases are high enough to activate the fuel reformer. After the engine is up to operating temperature the electric heater may be deactivated. Thus, during a first condition, the primary heat source for the fuel reformer may originate from an electric heater. And, during a second condition, the primary heat source for the fuel reformer may originate from the engine. Routine 1000 proceeds to 1016 after adjusting the engine to increase reformate production.

At 1016, routine 1000 judges if the desired rate of reformate consumption is greater than the threshold rate of reformate consumption. The threshold rate of reformate consumption may be a function of different operating conditions and may be a different rate of gaseous fuel injection for different engine operating conditions. For example, the threshold rate of reformate consumption may be an amount of gaseous fuel injected at a minimum pulse width of the gaseous fuel injector. Alternatively, the threshold rate of reformate consumption may be a reformate flow rate that provides a desired level of emissions and/or fuel economy at a particular engine operating condition. In another example, the threshold rate of reformate consumption may be the rate at which reformate is presently being produced by the fuel reformer. In still another example, the threshold rate of reformate consumption may be the highest rate that reformate may be produced by the fuel reformer. If the desired rate of reformate consumption is greater than the threshold rate of reformate consumption by the engine, routine 1000 proceeds to 1022. Otherwise, routine 1000 proceeds to 1018.

At 1018, reformate is consumed or used by the engine at the desired rate. Reformate may be injected to the engine at the desired rate by adjusting the position or timing of an injection valve and by accounting for the pressure in the reformate storage tank. If the pressure in the reformate tank increases, the gaseous fuel injector may be operated at a lower duty cycle so as to shorten the gaseous fuel injection time and compensate for the increase in reformate tank pressure. Similarly, if the pressure in the reformate tank decreases, the gaseous fuel injector may be operated at a higher duty cycle so as to lengthen the gaseous fuel injection time and compensate for the decrease in reformate tank pressure. If the pressure drop across the fuel injector is sufficient to establish sonic flow, the injector timing may not be adjusted since the gaseous flow rate will remain substantially the same.

At 1022, routine 1000 may limit the amount of reformate injection. Limiting the injection of reformate may include eliminating injection of reformate to the engine. Further, during some conditions the limiting of reformate injection may be overridden such that the desired amount of reformate is injected to the engine even though the amount of gaseous fuel stored is less than the first threshold amount. For example, limiting of injection gaseous fuel may be overridden when a torque request by an operator exceeds a predetermined threshold. Alternatively, limiting of injection of gaseous fuel may be overridden when the desired rate of gaseous fuel consumption is less than the rate reformate is being produced by the fuel reformer.

On the other hand, reformate injection may be limited when reformate stored in the reformate storage tank is less than the first threshold amount of reformate as determined at 1004. In another example, reformate rate of injection may be limited to a fixed value that is expected to be less than the rate of reformate production by the fuel reformer. In another example, reformate injection rate may be limited to a value that varies with engine operating conditions. For example, at a first operating condition, if the desired rate of reformate consumption is greater than a threshold, the amount of reformate injected may be a first fraction or percentage of the desired rate of consumption. At a second operating condition, if the desired rate of reformate consumption is greater than a threshold, the amount of reformate injected may be a second fraction or percentage of the desired rate of consumption. In one example, the first and second fractions may be based on a priority of operating conditions. For example, it may be more desirable to limit gaseous fuel injection to a higher percentage of the desired rate of reformate consumption when the engine is under higher loads (e.g., during a throttle tip-in or during acceleration) as compared to when the engine is operated at lower steady state conditions (e.g., highly diluted part-throttle conditions). Routine 1000 proceeds to exit after limiting reformate injection.

Referring now to FIG. 11, an example plot of simulated signals of interest when use of reformate is prioritized is shown. The first plot from the top of the figure represents the available amount of reformate in the fuel system. The Y-axis arrow indicates a direction of an increasing amount of available reformate. The amount of reformate in the fuel system 1120 may be determined from the temperature and pressure of the reformate storage tank and from sensing the oxygen concentration in the exhaust gases as discussed above. Horizontal marker 1118 represents a first threshold amount of available reformate. Horizontal marker 1116 represents a second threshold amount of available reformate.

The second plot from the top of the figure represents the amount of gaseous fuel injected to the engine. The amount of gaseous fuel injected to the engine 1122 increases in the direction of the Y-axis arrow.

The third plot from the top of the figure represents the amount of liquid fuel injected to the engine. The amount of liquid fuel injected to the engine 1124 increases in the direction of the Y-axis arrow.

The fourth plot from the top of the figure represents spark retard from desired spark timing. The amount of spark retard 1126 increases in the direction of the Y-axis arrow.

At time zero, indicated by the Y-axis of each plot, to the time of vertical marker 1100, the amount of available reformate 1120 is at a low level but gradually increases. During this time period, the amount of available reformate 1120 is less than the first threshold level 1118. In the same time period, gaseous fuel injection 1122 is deactivated while liquid fuel injection 1124 is at a higher level and combusted with air in a substantially stoichiometric mixture. In addition, the engine spark 1126 is initially retarded. In this example, engine spark is retarded to increase exhaust gas temperature so that output of the fuel reformer increases. The fuel reformer efficiency may be increased by increasing the temperature of the fuel reformer, at least up to a threshold temperature.

At time marker 1100, the amount of available reformate 1120 increases to an amount greater than the first threshold 1118. At the same time, injection of gaseous fuel 1122 to the engine begins and injection of liquid fuel to the engine is reduced. Further, since the amount of available reformate 1120 is greater than the first threshold 1118, the spark retard 1126 is reduced to increase engine operating efficiency.

At time marker 1102, the amount of available reformate 1120 exceeds a second threshold level 1116. When the available amount of reformate 1120 is greater than the second threshold level, the engine controller allows the amount of gaseous fuel injected to the engine 1122 to increase to a level that is greater than the desired level of gaseous fuel flow. As a result, injection of gaseous fuel 1122 is increased at marker 1102. Combustion of a stoichiometric mixture in engine cylinders continues at vertical marker 1102 by reducing the amount of liquid fuel injected 1124 in relation to the amount of gaseous fuel injected. In this example, spark retard 1126 remains low between vertical marker 1102 and 1104. However, in other examples, spark may be retarded when a portion of gaseous fuel injected is alcohol rather than reformate.

At time marker 1104, the amount of available reformate 1120 falls below the second threshold 1116. The engine controller reduces the flow of gaseous fuel 1122 to the engine in response to the available amount of reformate being less than the second threshold. Accordingly, the amount of liquid fuel injected to engine cylinders 1124 is increased so that stoichiometric combustion can continue. Spark retard 1126 remains low until the time of vertical marker 1106.

At vertical marker 1106, the amount of available reformate 1120 decreases to a level less than the first threshold level 1118. The engine controller deactivates gaseous fuel injection 1122 at vertical marker 1106 to conserve reformate for higher priority engine operating conditions (e.g., engine cold starting or high torque demand conditions). Again, the amount of liquid fuel injected to engine cylinders 1124 is increased so that stoichiometric combustion continues. Further, engine spark retard 1126 is increased so that fuel reformer efficiency can be increased. Engine spark retard may reduce engine torque, so engine air charge may be increased while spark is retarded so that driver demand torque is maintained. Spark retard 1126 is maintained at a higher level until the time of marker 1108.

At time marker 1108, the amount of available reformate 1120 is once again greater than the first threshold 1118. This condition allows spark retard 1126 to be reduced. Further, the injection of gaseous fuel 1122 resumes in response to the amount of available reformate 1120 increasing to a level greater than first threshold 1118. The engine controller simultaneously increases injection of gaseous fuel injection 1122 and reduces injection of liquid fuel 1124 to the engine. The liquid fuel may be reduced at a rate that corresponds to the rate that gaseous fuel fills the intake manifold.

At time marker 1110, the amount of available reformate 1120 has increased to a level greater than the second threshold level 1116. As a result, the engine controller allows the amount of gaseous fuel injected to the engine 1122 to increase to a level greater than the desired level of gaseous fuel injection. In accordance with increasing injection of gaseous fuel, the amount of liquid fuel injected 1124 is decreased.

At time marker 1112, the amount of available reformate 1120 has decreased to a level less than the second threshold level 1116. The engine controller responds by decreasing the rate of gaseous fuel injection 1122 and increasing the amount of liquid fuel injected 1124. Thus, under some engine operating conditions reformate is conserved while during other engine operating conditions reformate is consumed by the engine at a rate that may be higher than desired. In this way, the method of FIG. 10 may be used to preferentially use or conserve reformate.

As will be appreciated by one of ordinary skill in the art, routines described in FIGS. 2,3,6,8, and 10 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
operating an engine by injecting a gaseous fuel and a liquid fuel to at least one engine cylinder;
diluting an air-fuel mixture of the at least one engine cylinder with EGR; and
increasing a fraction of gaseous fuel relative to a fraction of liquid fuel injected to the at least one engine cylinder in response to an EGR amount of the at least one engine cylinder.

2. The method of claim 1, wherein said gaseous fuel is comprised of vaporized alcohol and/or $H_2$, CO, and $CH_4$, and wherein said gaseous fuel is increased in response to an operator tip-out.

3. The method of claim 1, wherein said fraction of gaseous fuel is injected to an intake manifold and wherein said air-fuel mixture is diluted via a group comprising one or more of an EGR valve, camshaft phasing, and a variable valve actuator, and where a duration and an amount of gaseous fuel injection is based on a number of cylinder events.

4. The method of claim 1, further comprising decreasing dilution of the air-fuel mixture via adjusting cam timing when reformate is not available.

5. The method of claim 1, wherein said fraction of gaseous fuel is injected directly into the at least one engine cylinder.

6. The method of claim 1, wherein said fraction of liquid fuel is greater than said fraction of gaseous fuel before said fraction of gaseous fuel is increased.

7. The method of claim 1, wherein said fraction of liquid fuel is less than said fraction of gaseous fuel before said fraction of gaseous fuel is increased.

8. The method of claim 1, wherein spark advance is adjusted in response to increasing said fraction of gaseous fuel relative to said fraction of liquid fuel injected to said at least one engine cylinder.

9. A method for operating an engine, comprising:
operating an engine by injecting a gaseous fuel and a liquid fuel to at least one engine cylinder;
diluting a mixture of at least one engine cylinder with an amount of EGR;
increasing a fraction of gaseous fuel relative to a fraction of liquid fuel injected to the at least one engine cylinder in response to the amount of EGR in said at least one engine cylinder during an operator tip-out; and
increasing the fraction of liquid fuel relative to the fraction of gaseous fuel injected to the at least one engine cylinder in response to a reduction in the amount of EGR in the at least one engine cylinder.

10. The method of claim 9, wherein said fraction of gaseous fuel is injected directly into said at least one engine cylinder, and where an amount of gaseous fuel injected before the operator tip-out is less than an amount of gaseous fuel injected after the operator tip-out, immediately following the operator tip-out.

11. The method of claim 9, wherein said fraction of liquid fuel is greater than said fraction of gaseous fuel before said fraction of gaseous fuel is increased.

12. The method of claim 9, wherein said fraction of liquid fuel is less than said fraction of gaseous fuel before said fraction of gaseous fuel is increased.

13. The method of claim 9, further comprising reducing a gas fraction of EGR in the at least one engine cylinder in response to said operator tip-out.

14. The method of claim 9, wherein said gaseous fuel is comprised of at least $H_2$, and where the fraction of gaseous fuel is increased for a duration that is responsive to a duration it takes to reduce a level of EGR in an intake manifold.

15. The method of claim 9, further comprising increasing said amount of EGR delivered to said at least one engine cylinder when said gaseous fuel is available, and decreasing said amount of EGR delivered to said at least one engine cylinder when a pressure of said gaseous fuel is less than a threshold amount.

16. A method for operating an engine, comprising:
operating an engine by injecting a gaseous fuel and a liquid fuel to at least one engine cylinder; and
deactivating injection of said gaseous fuel in response to an increasing torque demand that exceeds a threshold; and
reactivating injection of said gaseous fuel, and increasing a fraction of gaseous fuel relative to a fraction of liquid fuel injected to the at least one engine cylinder in response to an EGR amount of the at least one engine cylinder during an operator tip-out.

17. The method of claim 16, wherein said increasing torque demand that exceeds a threshold is a peak torque demand, the method further comprising increasing EGR flow to said at least one engine cylinder in response to said reactivation of said injection of said gaseous fuel.

18. The method of claim 16, where the fraction of gaseous fuel is increased for a duration that is responsive to a duration it takes to reduce an amount of EGR in an intake manifold during the operator tip-out.

19. The method of claim 16, wherein EGR flow to said at least one engine cylinder is decreased in response to said increasing torque demand that exceeds said threshold.

20. The method of claim 16, where prior to the operator tip-out, cylinder dilution provided via EGR is held at a cylinder dilution limit when reformate is not available, and where the cylinder dilution provided via EGR is increased from the cylinder dilution limit when reformate is available, and further comprising retarding spark in response to said deactivation of injection of said gaseous fuel.

* * * * *